US011227291B2

(12) United States Patent
Luff

(10) Patent No.: US 11,227,291 B2
(45) Date of Patent: Jan. 18, 2022

(54) METHODS AND APPARATUS TO PERFORM CONSUMER SURVEYS

(71) Applicant: The Nielsen Company (US), LLC, New York, NY (US)

(72) Inventor: Robert A. Luff, New York, NY (US)

(73) Assignee: The Nielsen Company (US), LLC, New York, NY (US)

( * ) Notice: Subject to any disclaimer, the term of this patent is extended or adjusted under 35 U.S.C. 154(b) by 526 days.

(21) Appl. No.: 15/990,187

(22) Filed: May 25, 2018

(65) Prior Publication Data

US 2018/0336573 A1 Nov. 22, 2018

Related U.S. Application Data

(63) Continuation of application No. 12/263,079, filed on Oct. 31, 2008, now abandoned.
(Continued)

(51) Int. Cl.
*G06Q 30/02* (2012.01)
(52) U.S. Cl.
CPC ......... *G06Q 30/02* (2013.01); *G06Q 30/0203* (2013.01); *G06Q 30/0271* (2013.01)
(58) Field of Classification Search
CPC . G06Q 30/02; G06Q 30/0203; G06Q 30/0271
See application file for complete search history.

(56) References Cited

U.S. PATENT DOCUMENTS

| 4,099,591 A | 7/1978 | Carr |
| 4,973,952 A | 11/1990 | Malec et al. |
(Continued)

FOREIGN PATENT DOCUMENTS

| CA | 2073387 | 1/1993 |
| EP | 1026847 | 8/2000 |
(Continued)

OTHER PUBLICATIONS

Yeung et al., "A Comparative Study on Location Tracking Strategies in Cellular Mobile Radio Systems," IEEE Global Telecommunications Conference, Nov. 14-26, 1995, pp. 22-28, 4 pages.
(Continued)

*Primary Examiner* — Pan G Choy
(74) *Attorney, Agent, or Firm* — Hanley, Flight & Zimmerman, LLC

(57) ABSTRACT

Methods and apparatus to conduct surveys are disclosed. An example apparatus includes an activity sensor to generate activity information, and a location sensor to generate location information corresponding to a portable device carried by the person. The apparatus further includes a processor to: generate media monitoring information indicative of exposure of the person to at least one of an advertisement or a product; determine a number of exposures the person has had based on the media monitoring information; identify a survey question based on the number of exposures; determine a speed of travel of the person based on at least one of the location information or the activity information; and compare the speed of travel to a threshold. The apparatus also includes a communication interface to automatically offer the survey question via the portable device when the processor determines the speed of travel is beneath the threshold.

20 Claims, 10 Drawing Sheets

Related U.S. Application Data

(60) Provisional application No. 60/985,017, filed on Nov. 2, 2007.

(56) References Cited

U.S. PATENT DOCUMENTS

| | | |
|---|---|---|
| 4,990,892 A | 2/1991 | Guest et al. |
| 5,014,206 A | 5/1991 | Scribner et al. |
| 5,119,104 A | 6/1992 | Heller |
| 5,214,687 A | 5/1993 | Känsäkoski et al. |
| 5,227,874 A | 7/1993 | Von Kohorn |
| 5,233,642 A | 8/1993 | Renton |
| 5,234,345 A | 8/1993 | Weinblatt |
| 5,241,534 A | 8/1993 | Omuro et al. |
| 5,287,266 A | 2/1994 | Malec et al. |
| 5,294,781 A | 3/1994 | Takahashi et al. |
| 5,319,638 A | 6/1994 | Lin |
| 5,345,392 A | 9/1994 | Mito et al. |
| 5,444,745 A | 8/1995 | Ali-Vehmas |
| 5,461,390 A | 10/1995 | Hoshen |
| 5,483,276 A | 1/1996 | Brooks et al. |
| 5,497,373 A | 3/1996 | Hulen et al. |
| 5,521,907 A | 5/1996 | Ennis, Jr. et al. |
| 5,580,254 A | 12/1996 | Ramsey |
| 5,603,095 A | 2/1997 | Uola |
| 5,640,002 A | 6/1997 | Ruppert et al. |
| 5,642,353 A | 6/1997 | Roy, III et al. |
| 5,675,510 A | 10/1997 | Coffey et al. |
| 5,686,888 A | 11/1997 | Welles, II et al. |
| 5,692,215 A | 11/1997 | Kutzik et al. |
| 5,740,035 A | 4/1998 | Cohen et al. |
| 5,768,680 A | 6/1998 | Thomas |
| 5,771,307 A | 6/1998 | Lu et al. |
| 5,799,154 A | 8/1998 | Kuriyan |
| 5,821,513 A | 10/1998 | O'Hagan et al. |
| 5,825,283 A | 10/1998 | Camhi |
| 5,859,838 A | 1/1999 | Soliman |
| 5,867,110 A | 2/1999 | Naito et al. |
| 5,878,384 A | 3/1999 | Johnson et al. |
| 5,966,696 A | 10/1999 | Giraud |
| 5,978,657 A | 11/1999 | Suzuki |
| 5,987,306 A | 11/1999 | Nilsen et al. |
| 5,991,735 A | 11/1999 | Gerace |
| 6,091,956 A | 7/2000 | Hollenberg |
| 6,098,048 A | 8/2000 | Dashefsky et al. |
| 6,108,637 A | 8/2000 | Blumenau |
| 6,115,680 A | 9/2000 | Coffee et al. |
| 6,252,522 B1 | 6/2001 | Hampton et al. |
| 6,286,005 B1 | 9/2001 | Cannon |
| 6,353,929 B1 | 3/2002 | Houston |
| 6,370,629 B1 | 4/2002 | Hastings et al. |
| 6,397,256 B1 | 5/2002 | Chan et al. |
| 6,433,689 B1 | 8/2002 | Hovind et al. |
| 6,470,386 B1 | 10/2002 | Combar et al. |
| 6,477,504 B1 | 11/2002 | Hamlin et al. |
| 6,480,497 B1 | 11/2002 | Flammer, III et al. |
| 6,493,649 B1 | 12/2002 | Jones et al. |
| 6,507,802 B1 | 1/2003 | Payton et al. |
| 6,516,189 B1 | 2/2003 | Frangione et al. |
| 6,546,257 B1 | 4/2003 | Stewart |
| 6,571,279 B1 | 5/2003 | Herz et al. |
| 6,574,614 B1 | 6/2003 | Kesel |
| 6,581,025 B2 | 6/2003 | Lehman |
| 6,584,375 B2 | 6/2003 | Bancroft et al. |
| 6,587,835 B1 | 7/2003 | Treyz et al. |
| 6,606,605 B1 | 8/2003 | Kolls |
| 6,647,269 B2 | 11/2003 | Hendrey et al. |
| 6,720,876 B1 | 4/2004 | Burgess |
| 6,745,011 B1 | 6/2004 | Hendrickson et al. |
| 6,754,470 B2 | 6/2004 | Hendrickson et al. |
| 6,772,129 B2 | 8/2004 | Alvarez et al. |
| 6,774,797 B2 | 8/2004 | Freathy et al. |
| 6,807,515 B2 | 10/2004 | Vogel et al. |
| 6,834,308 B1 | 12/2004 | Ikezoye et al. |
| 6,837,436 B2 | 1/2005 | Swartz et al. |
| 6,912,507 B1 | 6/2005 | Phillips et al. |
| 6,928,280 B1 | 8/2005 | Xanthos et al. |
| 6,940,403 B2 | 9/2005 | Kail, IV |
| 6,958,710 B2 | 10/2005 | Zhang et al. |
| 6,968,178 B2 | 11/2005 | Pradhan et al. |
| 6,970,131 B2 | 11/2005 | Percy et al. |
| 6,980,149 B1 | 12/2005 | Meyer |
| 7,013,136 B2 | 3/2006 | Frangione et al. |
| 7,013,478 B1 | 3/2006 | Hendricks et al. |
| 7,038,619 B2 | 5/2006 | Percy et al. |
| 7,092,964 B1 | 8/2006 | Dougherty et al. |
| 7,127,261 B2 | 10/2006 | Van Erlach |
| 7,149,549 B1 | 12/2006 | Ortiz et al. |
| 7,155,159 B1 | 12/2006 | Weinblatt et al. |
| 7,155,210 B2 | 12/2006 | Benson |
| 7,167,703 B2 | 1/2007 | Graham et al. |
| 7,176,834 B2 | 2/2007 | Percy et al. |
| 7,188,355 B1 | 3/2007 | Prokopenko et al. |
| 7,194,758 B1 | 3/2007 | Waki et al. |
| 7,206,647 B2 | 4/2007 | Kumar |
| 7,206,753 B2 | 4/2007 | Bancroft et al. |
| 7,215,280 B1 | 5/2007 | Percy et al. |
| 7,227,498 B2 | 6/2007 | Soliman |
| 7,239,981 B2 | 7/2007 | Kolessar et al. |
| 7,272,982 B2 | 9/2007 | Neuhauser et al. |
| 7,295,108 B2 | 11/2007 | Corrado et al. |
| 7,408,460 B2 | 8/2008 | Crystal et al. |
| 7,408,502 B2 | 8/2008 | Percy et al. |
| 7,420,464 B2 | 9/2008 | Fitzgerald et al. |
| 7,460,827 B2 | 12/2008 | Schuster et al. |
| 7,463,143 B2 | 12/2008 | Forr et al. |
| 7,466,241 B2 | 12/2008 | Lyle et al. |
| 7,471,987 B2 | 12/2008 | Crystal et al. |
| 7,586,439 B2 | 9/2009 | Percy et al. |
| 7,587,732 B2 | 9/2009 | Wright et al. |
| 7,592,908 B2 | 9/2009 | Zhang et al. |
| 7,630,867 B2 | 12/2009 | Behrens et al. |
| 7,636,742 B1 | 12/2009 | Olavarrieta et al. |
| 7,710,267 B2 | 5/2010 | Toyokawa et al. |
| 8,098,152 B2 | 1/2012 | Zhang et al. |
| 8,185,351 B2 | 5/2012 | Crystal et al. |
| 8,229,469 B2 | 7/2012 | Zhang et al. |
| 8,607,295 B2 | 12/2013 | Bhatia et al. |
| 2001/0037230 A1* | 11/2001 | Raveis, Jr. .......... G06Q 10/1097 705/7.21 |
| 2001/0037232 A1 | 11/2001 | Miller |
| 2002/0002504 A1 | 1/2002 | Engel et al. |
| 2002/0004740 A1 | 1/2002 | Shotey et al. |
| 2002/0008623 A1 | 1/2002 | Garber et al. |
| 2002/0010757 A1 | 1/2002 | Granik et al. |
| 2002/0022488 A1 | 2/2002 | Srinivasan et al. |
| 2002/0025795 A1 | 2/2002 | Sharon et al. |
| 2002/0047440 A1 | 4/2002 | Leijon et al. |
| 2002/0059218 A1 | 5/2002 | August et al. |
| 2002/0097193 A1 | 7/2002 | Powers |
| 2002/0104083 A1 | 8/2002 | Hendricks et al. |
| 2002/0107027 A1 | 8/2002 | O'Neil |
| 2002/0111847 A1 | 8/2002 | Smith, II |
| 2002/0112048 A1 | 8/2002 | Gruyer et al. |
| 2002/0128898 A1 | 9/2002 | Smith, Jr. et al. |
| 2002/0160758 A1 | 10/2002 | Pradhan et al. |
| 2002/0174222 A1 | 11/2002 | Cox |
| 2002/0196275 A1* | 12/2002 | Willner .................. G06Q 30/02 715/744 |
| 2003/0054757 A1 | 3/2003 | Kolessar et al. |
| 2003/0055707 A1 | 3/2003 | Busche et al. |
| 2003/0063222 A1 | 4/2003 | Creed et al. |
| 2003/0097302 A1 | 5/2003 | Overhultz et al. |
| 2003/0115586 A1 | 6/2003 | Lejouan et al. |
| 2003/0122708 A1 | 7/2003 | Percy et al. |
| 2003/0144899 A1 | 7/2003 | Kokubo |
| 2003/0171833 A1 | 9/2003 | Crystal et al. |
| 2003/0171975 A1 | 9/2003 | Kirshenbaum et al. |
| 2003/0172375 A1 | 9/2003 | Shaw et al. |
| 2003/0177488 A1 | 9/2003 | Smith et al. |
| 2003/0191653 A1 | 10/2003 | Birnbaum et al. |
| 2003/0200137 A1 | 10/2003 | Drummond |
| 2004/0015399 A1 | 1/2004 | Maggio |
| 2004/0054627 A1 | 3/2004 | Rutledge |
| 2004/0080452 A1 | 4/2004 | Percy et al. |

(56) References Cited

U.S. PATENT DOCUMENTS

| | | | |
|---|---|---|---|
| 2004/0088246 A1 | 5/2004 | Jepsen et al. | |
| 2004/0204983 A1* | 10/2004 | Shen | G06Q 30/0239 |
| | | | 705/14.43 |
| 2004/0260470 A1 | 12/2004 | Rast | |
| 2005/0035857 A1 | 2/2005 | Zhang et al. | |
| 2005/0071219 A1 | 3/2005 | Kahlert et al. | |
| 2005/0102696 A1 | 5/2005 | Westberg | |
| 2005/0136903 A1 | 6/2005 | Kashima et al. | |
| 2005/0144632 A1 | 6/2005 | Mears et al. | |
| 2005/0201826 A1 | 9/2005 | Zhang et al. | |
| 2005/0203798 A1 | 9/2005 | Jensen et al. | |
| 2005/0216509 A1 | 9/2005 | Kolessar et al. | |
| 2005/0243784 A1* | 11/2005 | Fitzgerald | G06Q 30/02 |
| | | | 370/338 |
| 2005/0264430 A1 | 12/2005 | Zhang et al. | |
| 2005/0272015 A1 | 12/2005 | Jensen et al. | |
| 2005/0272016 A1 | 12/2005 | Jensen et al. | |
| 2005/0272017 A1 | 12/2005 | Neuhauser et al. | |
| 2005/0272018 A1 | 12/2005 | Crystal et al. | |
| 2005/0273802 A1 | 12/2005 | Crystal et al. | |
| 2006/0003732 A1 | 1/2006 | Neuhauser et al. | |
| 2006/0004627 A1 | 1/2006 | Baluja | |
| 2006/0019723 A1 | 1/2006 | Vorenkamp et al. | |
| 2006/0028953 A1 | 2/2006 | Jensen et al. | |
| 2006/0041615 A1 | 2/2006 | Blank et al. | |
| 2006/0053110 A1 | 3/2006 | McDonald et al. | |
| 2006/0098027 A1 | 5/2006 | Rice et al. | |
| 2006/0111962 A1 | 5/2006 | Holsinger | |
| 2006/0164230 A1* | 7/2006 | DeWind | B60K 35/00 |
| | | | 340/461 |
| 2006/0168613 A1 | 7/2006 | Wood et al. | |
| 2006/0173880 A1 | 8/2006 | Alberts et al. | |
| 2006/0259922 A1 | 11/2006 | Sandgren et al. | |
| 2006/0270401 A1 | 11/2006 | Frangione et al. | |
| 2006/0284981 A1 | 12/2006 | Erol et al. | |
| 2006/0294225 A1 | 12/2006 | Grecco et al. | |
| 2007/0011040 A1 | 1/2007 | Wright et al. | |
| 2007/0038516 A1 | 2/2007 | Apple et al. | |
| 2007/0079331 A1 | 4/2007 | Datta et al. | |
| 2007/0088801 A1 | 4/2007 | Levkovitz et al. | |
| 2007/0156324 A1 | 7/2007 | Percy et al. | |
| 2007/0192168 A1 | 8/2007 | Van Luchene | |
| 2007/0288272 A1 | 12/2007 | Marks et al. | |
| 2007/0288277 A1 | 12/2007 | Neuhauser et al. | |
| 2007/0288476 A1 | 12/2007 | Flanagan, III et al. | |
| 2007/0294057 A1 | 12/2007 | Crystal et al. | |
| 2007/0294132 A1 | 12/2007 | Zhang et al. | |
| 2007/0294705 A1 | 12/2007 | Gopalakrishnan et al. | |
| 2007/0294706 A1 | 12/2007 | Neuhauser et al. | |
| 2008/0004951 A1* | 1/2008 | Huang | G06Q 30/0269 |
| | | | 705/14.67 |
| 2008/0010110 A1 | 1/2008 | Neuhauser et al. | |
| 2008/0051033 A1 | 2/2008 | Hymes | |
| 2008/0086304 A1 | 4/2008 | Neuhauser | |
| 2008/0086533 A1 | 4/2008 | Neuhauser et al. | |
| 2008/0091087 A1 | 4/2008 | Neuhauser et al. | |
| 2008/0091451 A1 | 4/2008 | Crystal | |
| 2008/0091762 A1 | 4/2008 | Neuhauser et al. | |
| 2008/0109391 A1 | 5/2008 | Chan | |
| 2008/0126420 A1 | 5/2008 | Wright et al. | |
| 2008/0133291 A1 | 6/2008 | Nasser et al. | |
| 2008/0140479 A1 | 6/2008 | Mello et al. | |
| 2008/0147461 A1* | 6/2008 | Lee | G06Q 30/02 |
| | | | 705/7.34 |
| 2008/0172261 A1* | 7/2008 | Albertson | G06K 9/00335 |
| | | | 382/103 |
| 2008/0177695 A1 | 7/2008 | Nasser et al. | |
| 2008/0191934 A1 | 8/2008 | Baker et al. | |
| 2008/0243573 A1 | 10/2008 | Nasser et al. | |
| 2008/0243590 A1 | 10/2008 | Rich | |
| 2008/0249859 A1 | 10/2008 | Angell et al. | |
| 2009/0013048 A1 | 1/2009 | Partaker et al. | |
| 2009/0013091 A1 | 1/2009 | Zhang et al. | |
| 2009/0037575 A1 | 2/2009 | Crystal et al. | |
| 2009/0073035 A1 | 3/2009 | Percy et al. | |
| 2009/0150217 A1 | 6/2009 | Luff | |
| 2009/0164284 A1 | 6/2009 | Koiso et al. | |
| 2009/0171767 A1 | 7/2009 | Kolessar | |
| 2009/0222325 A1 | 9/2009 | Anderson et al. | |
| 2009/0276235 A1 | 11/2009 | Benezra et al. | |
| 2010/0206949 A1 | 8/2010 | Mattlin et al. | |
| 2010/0268540 A1 | 10/2010 | Arshi et al. | |
| 2010/0268573 A1 | 10/2010 | Jain et al. | |
| 2011/0099142 A1 | 4/2011 | Karjalainen et al. | |
| 2011/0106587 A1 | 5/2011 | Lynch et al. | |
| 2011/0224992 A1 | 9/2011 | Chaoui et al. | |
| 2011/0313849 A1 | 12/2011 | Brueck et al. | |
| 2012/0130802 A1 | 5/2012 | Shimizu | |
| 2012/0245978 A1 | 9/2012 | Jain et al. | |

FOREIGN PATENT DOCUMENTS

| | | |
|---|---|---|
| EP | 1133090 | 9/2001 |
| JP | 11259558 | 9/1999 |
| JP | H11259422 | 9/1999 |
| JP | 2000209578 | 7/2000 |
| JP | 2008197266 | 8/2008 |
| WO | 9417609 | 8/1994 |
| WO | 9955057 | 10/1999 |
| WO | 2002015086 | 2/2002 |
| WO | 02073885 | 9/2002 |
| WO | 02098029 | 12/2002 |
| WO | 03087871 | 10/2003 |
| WO | 2004051303 | 6/2004 |
| WO | 2004051304 | 6/2004 |
| WO | 2005019853 | 3/2005 |
| WO | 2006015188 | 2/2006 |
| WO | 2006015339 | 2/2006 |
| WO | 2006098414 | 9/2006 |
| WO | 2007044356 | 4/2007 |
| WO | 2007073484 | 6/2007 |
| WO | 2008118119 | 10/2008 |

OTHER PUBLICATIONS

Dunnett et al., "An Evaluation of Cinema Advertising Effectivenes," Marketing Bulletin, vol. 7, Research Note 2, 1996, pp. 58-66, 8 pages.

Guzdial et al, Analyzing and Visualizing Log Files: A Computational Science of Usability, May 1996, 17 pages.

Balakrishnan et al. "A Comparison of Mechanisms for Improving TCP Performance over Wireless Links," ACMSIGCOMM '96, Stanford, CA, Aug. 1996, 14 pages.

Ko, "Automatic Call Generation and Analysis—Network Testing and Cellularsurvey Tools," IEEE Colloquium of Making Life Easier—Network Design and Management Tools (Digest No. 1996/217), Oct. 10, 1996, pp. 7/1-7/6, 1 page.

Jain et al., "Congestion Avoidance in Computer Networks With a Connectionless Network Layer," Digital Equipment Corporation, Jun. 1, 1997, 21 pages.

Battekkem "Lexington Area Travel Data Collection Test," Global Positioning Systems for Personal Travel Serveys, Final Report to Office of Highway Information Management Office of Technology Application, Sep. 1997, 92 pages.

Vucetic et al., "Network Management Applications for Wireless Local Loop," Electrotechnical Conference, vol. 2, May 1998, pp. 787-791, 5 pages.

Byfield et al., "The Digital Revolution: Will it Lead to the Ultimate Demise of Newspapers?" Worldwide Research Symposium 1999, 10 pages.

Schlosser et al., "Survey of Internet Users' Attitudes Toward Internet Advertising," Journal of Interactive Marketing, vol. 13, No. 3, Summer 1999, pp. 34-54, 21 pages.

Turley et al., "The Impact and Effectiveness of Advertisements in a Sports Arena," Journal of Services Marketing, vol. 14, No. 4, 2000, pp. 323-336, 14 pages.

Bahl et al., "A Software System for Locating Mobile Users: Design, Evaluation, and Lessons", Technical Report MSRTR-2000-12, Microsoft

(56) References Cited

OTHER PUBLICATIONS

Research, retrieved from internet: [http:ffresearch.micosoft.com/-bahl/Papers/Pdf/radar.pdf], Feb. 2000, 13 Pages.

Aaker et al., "Marketing Research," 2001, 38 pages.

Azondekon et al., "Service Selection in Networks Based on Proximity Confirmation Using Infrared," International Conference on Telecommunications (ICT) Beijing, retrieved from Internet: [http://www.scs.carleton.ca/-barbeau/Publications/2002/azondekon.pdf], 2002, 5 Pages.

Clark, "Shopping With Detectives: Customer Tracking Takes the Mystery Out of Store Design (The Digital Store)," Display & Design Ideas, vol. 14, No. 5, p. 48(1), May 2002, 2 pages.

Assael et al., "Consumer Serveys vs. Electronic Measures for Single-Source Data," Journal of Advertising Research, vol. 42, No. 5, Sep./Oct. 2002, 8 pages.

Camp et al., "A Survey od Mobility Models for Ad Hoc Network Research," Wireless Communication & Mobile Computing (WCMC): Special Issue on Mobile Ad Hoc Networking Research, Trends and Applications, vol. 2, No. 5, pp. 483-502, 2002, 27 pages.

Ishii et al., "Detection of Attention Behavior for Marketing Information System," IEEE Cat. No. 02EX649, Seventh International Conference on Control, Automation, Robotics and Vision, Dec. 2002, pp. 710-715, 6 pages.

Haitsma et al., "A Highly Robust Audio Fingerprinting System," Journal of New Music Research, vol. 32, No. 2, 2003, 9 pages.

Byfield, "A Consumer Insight Perspective: Global Media Change," TV: Social Context, 2004, 6 pages.

Probst, "How a Customers First Impression Impacts Sales Effectiveness in an Automotive Retail Facility with Correlation to the Purchasing Decision," Research Paper, The Graduate College, University of Wisconsin-Stout, Jan. 2004, 47 pages.

Yang et al., "Customer Perceived Value, Satisfaction, and Loyalty: The Role of Switching Cost," Psychology and Marketing, vol. 21, No. 10, pp. 799-822, Oct. 2004, published on line in Wiley InterScience, 24 pages.

Nandan et al., "AdTorrent: Digital Billboards for Vehicular Networks," IEEE/ACM International Workshop on Vehicle-to-Vehicle Communications, 2005, pp. 286-294, 9 pages.

Lee et al., "Repeat Exposure Effects of Internet Advertising," HEC Research Papers Series, 809, 2005, 29 pages.

Battiti et al., "Location-Aware Computing: a Neutral Network Model for Determining Location in Wireless LANS," University of Trento: Department of Information and Communication Technology, Technical Report #DIT-02-0083, Feb. 2002, 17 pages.

Abrams et al., "Personalized Ad Delivery when Ads Fatigue: An Approximation Algorithm," International Workshop on Web and Internet Economics 2007: Internet and Network Economics, Lecture Notes in Computer Science, vol. 4858, pp. 535-540, 6 pages.

Breen, "An Industry on the Verge," In-Store Marketing Institute, Oct. 1, 2007, 16 pages.

International Searching Authority, "Search Report and Written Opinion," issued in connection with International Application No. PCT/US2008/056282, dated Aug. 21, 2008, 10 pages.

International Searchin Authority, "International Search Report," issued in connection with International Patent Application No. PCT/US2007/080235, dated Oct. 23, 2008, 4 pages.

International Bureau, "International Preliminary Report on Patentability," issued in connection with International Patent Application No. PCT/US2007/080235, dated Apr. 16, 2009, 8 pages.

Forrester Research, "Understanding and Harnessing Mobile Research," Apr. 23, 2009, 33 pages.

Lang Research, "Qualiquant Analytic Techniques," retrieved from the Internet on Apr. 29, 2009, 2 pages.

Nielsen, "Gain a Holistic View of Consumers," retrieved from the Internet on Apr. 29, 2009, 2 pages.

International Searching Authority, "Search Report", issued in connection with PCT application No. PCT/F12009/050186 dated Dec. 1, 2009, 4 pages.

The United States Patent and Trademark Office, "Non-Final Office Action," issued in connection with U.S. Appl. No. 12/434,294, dated May 25, 2011, 27 pages.

The United States Patent and Trademark Office, "Final Office Action," issued in connection with U.S. Appl. No. 12/434,294, dated Jan. 6, 2012, 32 pages.

The United States Patent and Trademark Office, "Office Action," issued in connection with U.S. Appl. No. 13/001,492, dated Aug. 23, 2013, 6 pages.

The United States Patent and Trademark Office, "Non-Final Office Action," issued in connection with U.S. Appl. No. 12/263,079, dated Sep. 26, 2011, 22 pages.

The United States Patent and Trademark Office, "Final Office Action," issued in connection with U.S. Appl. No. 12/263,079, dated May 10, 2012, 34 pages.

The United States Patent and Trademark Office, "Non-Final Office Action," issued in connection with U.S. Appl. No. 12/263,079, dated Sep. 13, 2012, 35 pages.

The United States Patent and Trademark Office, "Final Office Action," issued in connection with U.S. Appl. No. 12/263,079, dated Jul. 22, 2013, 52 pages.

The United States Patent and Trademark Office, "Non-Final Office Action," U.S. Appl. No. 12/263,079, dated Nov. 6, 2014, 43 pages.

The United States Patent and Trademark Office, "Final Office Action," issued in connection with U.S. Appl. No. 12/263,079, dated Jun. 2, 2015, 59 pages.

The United States Patent and Trademark Office, "Examiner's Answer," issued in connection with U.S. Appl. No. 12/263,079, dated Jul. 22, 2016, 52 pages.

The United States Patent and Trademark Office, "Patent Board Decision," issued in connection with U.S. Appl. No. 12/263,079, dated Mar. 29, 2018, 13 pages.

\* cited by examiner

| SMITH FAMILY ACTIVITY DASHBOARD | | | | | |
|---|---|---|---|---|---|
| Time | Activity | Person | | | |
| | | Bob (Dad) | July (Mom) | Doug (Son) | Beth (Daughter) |
| 6:00 AM | | Pre-Work | Pre-Work | Pre-School | Pre-School |
| 7:00 AM | | | | | |
| 8:00 AM | | Work | Work | School | School |
| 9:00 AM | | | | | |
| 10:00 AM | | | | | |
| 11:00 AM | | | | | Lunch |
| 12:00 PM | | | | Lunch | School |
| 1:00 PM | | | | School | |
| 2:00 PM | | | | | |
| 3:00 PM | | | | Basketball | In Car |
| 4:00 PM | | | | In Car | TV |
| 5:00 PM | | | Dinner | Dinner | Dinner |
| 6:00 PM | | Dinner | Free | Homework | Homework |
| 7:00 PM | | Free | | | |
| 8:00 PM | | | | TV | TV |
| 9:00 PM | | | | Bed | Bed |
| 10:00 PM | | Bed | Bed | | |

FIG. 9

METHODS AND APPARATUS TO PERFORM CONSUMER SURVEYS

RELATED APPLICATIONS

This Patent arises from a continuation of U.S. patent application Ser. No. 12/263,079, filed on Oct. 31, 2008, and claims the benefit of U.S. Provisional Patent Application Ser. No. 60/985,017, filed on Nov. 2, 2007. Both U.S. patent application Ser. No. 12/263,079 and U.S. Provisional Patent Application Ser. No. 60/985,017 are incorporated herein by reference in their entireties.

FIELD OF THE DISCLOSURE

The present disclosure relates generally to monitoring consumer behavior and, more particularly, to methods and apparatus to perform consumer surveys.

BACKGROUND

Surveys are often used to gather observer reactions and/or opinions about products, services, or media content (e.g., entertainment media, advertisements, etc.). Traditionally, such surveys include a set of questions that are presented to people at surveying stations or by surveying agents located in public places. The survey questions are pre-selected, and the same questions are presented to every person. Presenting standard survey questions in this manner may adversely affect the value of responses. For example, if the survey is about a particular product or a particular advertisement, the person being surveyed may never have been exposed to that particular advertisement or may not be a user of that particular product.

In addition, many traditional surveying techniques require that people responding to survey questions rely on their recall of the subjects (e.g., products, advertisements, etc.) being surveyed since such surveys may be conducted well after (e.g., hours or days) the people were exposed to the surveyed subjects. However, numerous factors may cause a respondent's recall to be inaccurate including, for example, the time lapsed since the respondent's last exposure to the surveyed subject or the respondent's familiarity (or lack thereof) with the surveyed subject. Thus, due to the dependence on a respondent's recall or familiarity, responses to traditional survey questions are likely to inaccurately reflect the respondent's attitude or the attitude of a target market about the surveyed subject. Further, survey questions presented after a significant delay since a respondent's last exposure to the surveyed subject often cause the respondent to ponder the subject being surveyed and attempt to recall her or his initial reaction, thereby causing the respondent to provide a less emotional reaction than that which was actually experienced at the time that the respondent was exposed to or was using the surveyed subject.

BRIEF DESCRIPTION OF THE DRAWINGS

FIG. 9 is an example matrix to display collected monitoring information reflecting the activity of a monitored family.

DETAILED DESCRIPTION

Figure 1:
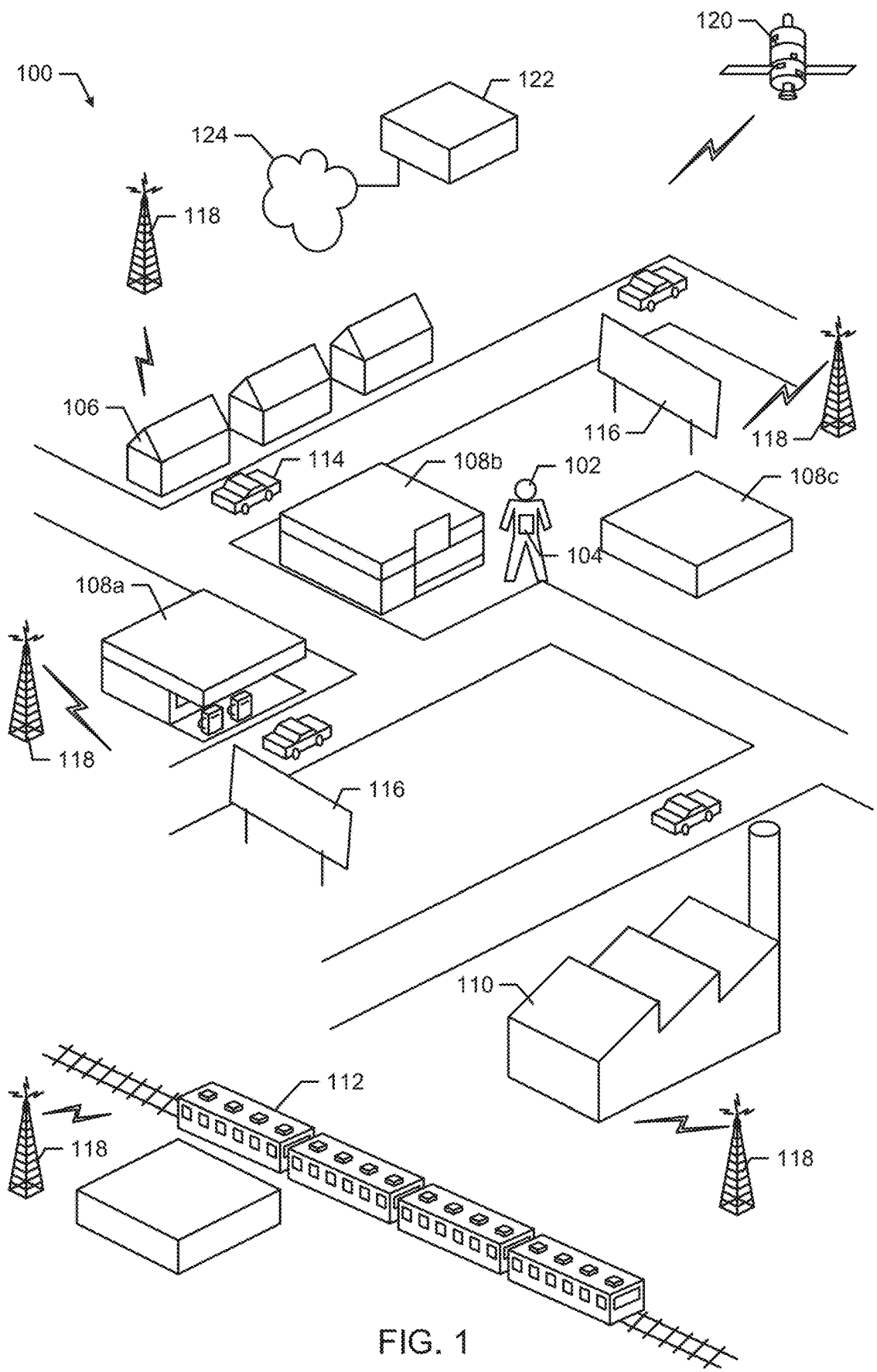
FIG. 1 illustrates an example geographic area in which the example methods and apparatus described herein can be implemented to perform consumer surveys.

Although the following discloses example methods, articles of manufacture, apparatus and/or systems including, among other components, software executed on hardware, it should be noted that such methods, articles of manufacture, apparatus and/or systems are merely illustrative and should not be considered as limiting. For example, it is contemplated that any or all of these hardware and software components could be embodied exclusively in hardware, exclusively in software, exclusively in firmware or in any combination of hardware, firmware and/or software. Accordingly, while the following describes example methods, articles of manufacture, apparatus and/or systems, the examples provided are not the only way to implement such methods, articles of manufacture, apparatus and/or systems.

The example methods, articles of manufacture, apparatus and/or systems described herein can be used to present dynamically generated surveys or Smart Surveys™ by dynamically selecting questions to be presented to persons (e.g., consumers, survey panel members, etc.) via a portable device based on activities of those persons. In particular, the example methods, articles of manufacture, apparatus and/or systems described herein are configured to use monitoring information indicative of activities that are unique to a particular monitored person throughout a day to determine survey questions that are relevant to that person based on the person's activities. In this manner, unlike traditional surveys which present respondents with a predetermined, pre-populated list of questions with a limited branch structure in an attempt to be generally relevant to a large group of people, the methods, articles of manufacture, apparatus and/or systems described herein can be used to generate dynamically adaptable surveys that can be tailored to be relatively more relevant than traditional surveys to each individual person surveyed and, thus, to collect more detailed and/or meaningful data. Thus, in these examples, the traditional cost of human surveyors are avoided without losing the adaptability of such human surveyors (e.g., without losing the surveyor's transparent real-time reactions to a respondent's experience, knowledge of the presented or related products (which may influence a respondent or a respondent walking away from a surveyor), etc.). The examples describe herein use intelligent software techniques that may impartially present important research questions to the respondents at times that are selected to obtain meaningful data while not wasting respondent resources (e.g., by avoiding mismatching respondents with survey topics).

To present survey questions to respondents, each respondent that has previously consented to participate in the survey program is instructed to carry a portable device having software, firmware and/or hardware therein to perform activity detection processes, present survey questions, and communicate survey answers to a central facility. The surveys are conducted at key pre-/post-purchase and/or advertisement exposure times, as detailed below. In some example implementations, the portable device may be implemented using a portable mobile device such as a mobile cellular telephone (e.g., a smart phone), a personal digital assistant (PDA), a portable music player (e.g., an IPod), a portable game machine (e.g., a video game player), a portable television, an automobile navigation system, and/or other devices that use Skype, Wi-Fi or other non-cellular based communications networks to communicate in real-time or near real-time, by, for example, downloading software to the mobile device and/or attaching hardware to the mobile device. In other examples, non-portable devices may also be used in place of or in addition to portable devices to present respondent with surveys. Example non-portable devices include televisions, set-top boxes, in-store television or digital display monitors and/or other devices that include two-way communications. In some examples, the respondents agree to have the example technology downloaded to their mobile device(s). Because the respondents have previously consented to participate in the surveys, the example methods and apparatus described herein avoid so-called "call-bank" solicitation or random dialing solicitation. The mobile device may be provided with software that causes it to emit a unique audible alert when it receives a survey question from a central facility that can be distinguished by a person as indicating that a survey question has been received and is ready for presentation. For example, there may be a distinct survey ringtone (that the respondent may associated as a "survey ringtone") to indicate that a survey opportunity is available and to which the respondent can reply or hit, for example, any key to park (i.e., delay) the survey for later attention. Additionally or alternatively, in some examples, the mobile device may use vibrations as the alert when it is desirable to have the audio alert silenced. Although the portable device may be implemented in any desired fashion (e.g., a PDA, a smart phone, a dedicated device, etc.), the presently preferred approach is to employ a cellular phone in this role. Accordingly, the following description will refer to a cellular phone as a preferred example implementation, but it should be understood that other devices could alternatively be used in this role. In addition, any of these devices may be used to detect the respondents' activities, present survey questions and/or collect responses.

To generate dynamically adaptable surveys, the example methods, articles of manufacture, apparatus and/or systems described herein monitor people's daily activities (e.g., activity at home, activity at work, daily routines, paths of travel, credit card usage history including past location of stores, specific purchases and/or pattern(s) of purchases), media exposure (e.g., advertisement exposure, television/radio programming exposure, etc.), product exposure (computer-related activity, etc.) by collecting monitoring information with activity monitoring apparatus and systems, comparing the collected monitoring information to predetermined patterns or rules that specify particular survey questions based on particular activity patterns or trends, and presenting the survey questions selected based on the comparison process and/or further analysis. In this manner, the example methods, articles of manufacture, apparatus and/or systems can be used to collect responses from survey respondents that are highly relevant and meaningful to the underlying subject matter of the survey questions due to the respondents' activities or media exposures related to that subject matter.

A dynamically generated survey such as a Smart Survey™ can be configured to automatically present itself on a portable device such as, for example, a mobile cellular telephone, when a combination of activity criteria have been met. Such combination of activity criteria can be predefined and provided as an activity rule, pattern, trend and/or change in pattern or trend (including for example, a break in a normal pattern such as not watching a television show that is normally watched or not going to work at the time this is normally done). An example activity rule can specify that a particular survey question is to be presented to a survey respondent when (a) the survey respondent is exposed to a particular advertisement for a first product X times (e.g., a television, radio or Internet advertisement, (b) the respondent has been exposed to a rival or competitor's advertisement for a second, competing, product Y times, and/or (c) the respondent is in a retail location/section where first and/or second products related to the television advertisements are available. By predefining activity rules or patterns that trigger the respective survey questions, the survey questions can automatically adapt based on past and/or current factors or activity criteria (e.g., which advertisements were consumed, the frequency of exposure to the advertisements, the media through which the exposure occurred (e.g., television channel, billboard, poster, radio station, webpage etc.), which store the respondent patronizes, other recent survey responses, speed of travel (e.g., the survey can be suppressed or delayed if a speed indicating that the respondent is driving is detected), etc.). By presenting survey questions on portable devices that can be carried or worn by survey respondents, the surveys can be conducted at locations and times that are highly relevant to the survey questions (e.g., point-of-sale locations and times, advertisement exposure locations and times, etc.). For example, if a person enters a retail establishment (e.g., a grocery store), the example methods, articles of manufacture, apparatus and/or systems described herein can be used to detect activity monitoring information indicative of the person's presence within the retail establishment, dynamically select a survey question related to that retail establishment, and communicate the survey question to the person's portable device for presentation to the person. In addition, the survey questions, or portions thereof, may be transferred to the person's personal computer, game player or any other device. Each respondent can provide survey responses by keyboard, touch screen (if supported by the portable device) or other hand motion, or by voice response (e.g., via an audio sensor such as a microphone), whichever the user and/or system implementer prefers and/or supports. In some example implementations, a Smart Survey™ program is implemented using panel members that agree to participate in a market research study involving the dynamically generated surveys implemented in accordance with the example methods, articles of manufacture, apparatus and/or systems described herein.

To monitor a person's activity a portable device (e.g., consumer phones, game controllers, etc., a belt-mountable device or any of the other devices described herein) can be provided with one or more sensors and interfaces to detect, for example, movement, location, audio/video media, direction, etc. For example, the portable device could be provided with a global positioning system (GPS), WiFi locator, radio frequency (RF) signal based locators and/or other technology tracking/logging device(s) to generate location information (e.g., location coordinates) indicative of the locations and paths of travel of a person. The portable device could alternatively or additionally be provided with an electronic compass, an accelerometer, an altimeter, and/or interfaces for location and/or motion sensing. In some example implementations, the portable device can be configured to implement an inertia or dead-reckoning process to generate location information when the portable device is within a building in which GPS signals cannot be received. To determine the advertisements, products, retail establishments, etc. to which a person may be exposed based on the generated location information, the location information can be compared to location information stored in a database in association with names or identifiers of advertisements, products, retail establishments, etc. located at those locations. Additionally or alternatively, such comparisons and/or determinations can be based on collected audio (e.g., 'beacons'), RF, and/or infrared emissions received from an advertisement location, a store, an event location, a store shelf, a product, a product display, store doors, etc. In other examples, the portable device may include a GPS/three-axis accelerometer, or inertia detection capability to detect walking, standing, sitting, biking, running, driving or other motion-related activities that can be used as a further source of specific activity or as a means to detect an appropriate, safe or otherwise advantageous time to launch or not to launch a survey, as described below.

Further, a wireless component may be added to a bracelet, watch, necklace, pendant, ring, credit card, pen, coin-sized object or other similar device designed to be worn or carried inside a pocket that includes a three-axis or equivalent detection means to detect arm, wrist, body, and/or hand motion(s). Further, the device may include some form of wireless communications links (e.g., WiFi, WIMax, IR, etc.) to facilitate transfer of data (e.g., in real time, or near real time) from the respondent's portable device to a receiver at a media or consumer research company and/or to other portable devices. The devices may transmit information related to the respondent's activity including, for example, typing, instant messaging, playing video games, writing, reading, etc. This activity data can be used to select surveys, to select when to trigger a survey, and/or to identify pools of respondents to survey at future times based on historical activity records (e.g., that can be used to predict future availability at preferred survey times such as 5 hours after a commercial exposure or product usage, etc.)

The portable device may additionally or alternatively be equipped with a media measurement receiver to detect exposure to media (e.g., television, radio and/or the Internet). An example media receiver is an audio sensor such as a microphone or other device to collect audio output by a media device. A code or a signature can be collected from the audio to identify the media output by the media device (e.g., an advertisement). Methods and apparatus for performing such media exposure identification are described in, for example, U.S. Patent Publication No. 2005/0054285 entitled "Methods and Apparatus to Adaptively Select Sensor(s) to Gather Audience Measurement Data Based on a Variable System Factor and a Quantity of Data Collectible by the Sensors," which is hereby incorporated by reference in its entirety.

To monitor a person's activities within a home or other environment (e.g., work) where a person might regularly conduct daily activities the environment can be provided with sensors installed throughout the environment that can detect, for example, motion events, sound events, or other types of events that may be indicative of particular activities. The sensors may have small form factors for ease of mounting in different locations. For example, an activity sensor can be adhered to kitchen appliances (e.g., a refrigerator, a coffee maker, a microwave, a stove, etc.), dinette furniture (e.g., chairs), kitchenware, or other kitchen items to detect survey respondents' activities in their kitchen. The activity sensors can sense, for example, when a person makes coffee, drinks coffee, cooks, visits the refrigerator, etc. and wirelessly communicate information or signals indicative of the sensed activity to a home unit (e.g., a computer and/or a media intelligence company provided home unit) within the household. The home unit can subsequently communicate the activity information to a central facility of a market research entity conducting surveys. A dynamic survey system either on the portable device or located at the central facility can analyze (1) the activity information generated by the sensors throughout the household and/or (2) the activity information generated by portable devices carried by the household members to determine which survey questions to present and when to present those survey questions.

Turning to FIG. 1, the example methods, articles of manufacture, apparatus and/or systems described herein can be implemented in indoor and/or outdoor environments of an example geographic area 100 to generate and conduct dynamically adapting surveys. Although, the example geographic area 100 is shown by way of example as a city or town having a residential area, a business area, an industrial area, etc., the example methods, articles of manufacture, apparatus and/or systems may be used in any area including indoor areas and/or outdoor areas.

As shown, the example geographic area 100 includes a plurality of structures and transportation mediums within which a person 102 (e.g., a survey respondent) having a portable monitoring and survey device 104 (e.g., the portable device 104) may be monitored and surveyed. In particular, the person 102 may be monitored and surveyed in a household 106, in one or more retail establishments 108a, 108b, and 108c (e.g., a gas station 108a, a retail store 108b, and/or a recreational complex 108c), in a workplace structure 110, in a train 112, and/or in a car 114. The example geographic area 100 also includes a plurality of advertisements 116 (e.g., billboards 116) at locations that facilitate exposure to consumers.

The portable device 104 may be configured to obtain and/or generate activity-related information (e.g., location information, motion information, movement information, etc.) on a continuous, periodic or aperiodic basis. In particular, as described in greater detail below in connection with FIG. 4, the portable device 104 may include one or more location or positioning devices that enable the portable device 104 to obtain location or position information using, for example, internal devices and/or one or more location information systems. For example, the example geographic area 100 also includes one or more location information systems that may be used for communication of location information with the portable device 104. Specifically, the location information generation systems may include a plurality of radio frequency (RF) transceiver towers 118 and one or more satellites represented in FIG. 1 by a satellite 120 to implement GPS location processes.

The RF transceiver towers 118 may be implemented using any RF communication technology including cellular communication technology (e.g., GSM, CDMA, TDMA, AMPS, etc.). The RF transceiver towers 118 may be configured to transmit or broadcast positioning information and/or any type of other information that may be used by the portable device 104 to generate location information. The satellite 120 may also be used to communicate location-related information to the portable device 104. For example, the satellite 120 may be used to implement any satellite positioning system (SPS) such as, for example, the global positioning system (GPS). The portable device 104 may receive the position information from the satellite 120 and determine location information associated with the locations to which the portable device 104 is moved.

The example methods, articles of manufacture, apparatus and/or systems described herein may be configured to generate path of travel information for the survey respondent 102 based on location, motion, and/or movement information to analyze the activities of the survey respondent 102. For example, the paths of travel of the respondent 102 may be analyzed to determine places visited by the respondent 102 and/or to determine media (e.g., advertisements), products, retail establishments etc. to which the respondent was exposed. Example methods, articles of manufacture, apparatus and/or systems that may be used to generate and/or analyze path of travel information are described in U.S. patent application Ser. No. 11/668,919, filed on Jan. 30, 2007, which is hereby incorporated by reference herein in its entirety.

The portable device 104 may also be configured to generate and/or collect media exposure information associated with any media to which the person 102 may be exposed. For example, as described in greater detail below in connection with FIG. 4, the portable device 104 may be configured to obtain codes and/or signatures (e.g., audio codes and or audio signatures) associated with video programs (e.g., DVD movies, television programming, etc.), audio programs (e.g., CD audio, radio programming, etc.), etc. Additionally, the portable device 104 may be configured to receive codes (e.g., audio codes and/or RF codes) associated with alternate forms of media including, for example, the billboards 116 or any other form of publicly viewable advertising (e.g., posters, in-store advertisement displays, etc.). For example, advertisements (e.g., the billboards 116) may include audio broadcasting device(s) (not shown) and/or RF broadcasting device(s) (not shown) configured to emit respective codes that uniquely identify each advertisement and/or each billboard location. If the portable device 104 is in proximity of any of the billboards 116, the portable device 104 may obtain the billboard code as media exposure information, thus indicating that the person 102 was exposed to one of the billboards 116 corresponding to the obtained billboard code. Example systems and methods for extracting or obtaining information such as, for example, billboard codes from media objects is described in U.S. Pat. No. 6,353,929, which is incorporated herein by reference in its entirety.

The portable device 104 may be configured to communicate location information, motion information, movement information, and/or media exposure information to a central facility 122 via a network 124 for subsequent analyses or processing. The central facility 122 may include an activity analyzer to analyze the activities of the person 102 to, for example, dynamically select survey questions for the person 102. The network 124 may be implemented using any communication medium such as, for example, a cellular network, a satellite network, a public telephone switching network, a DSL network, a cable network, the Internet, etc. For example, the network 124 may be communicatively coupled to the plurality of RF transceiver towers 118 and/or to the satellite 120.

Figure 2:
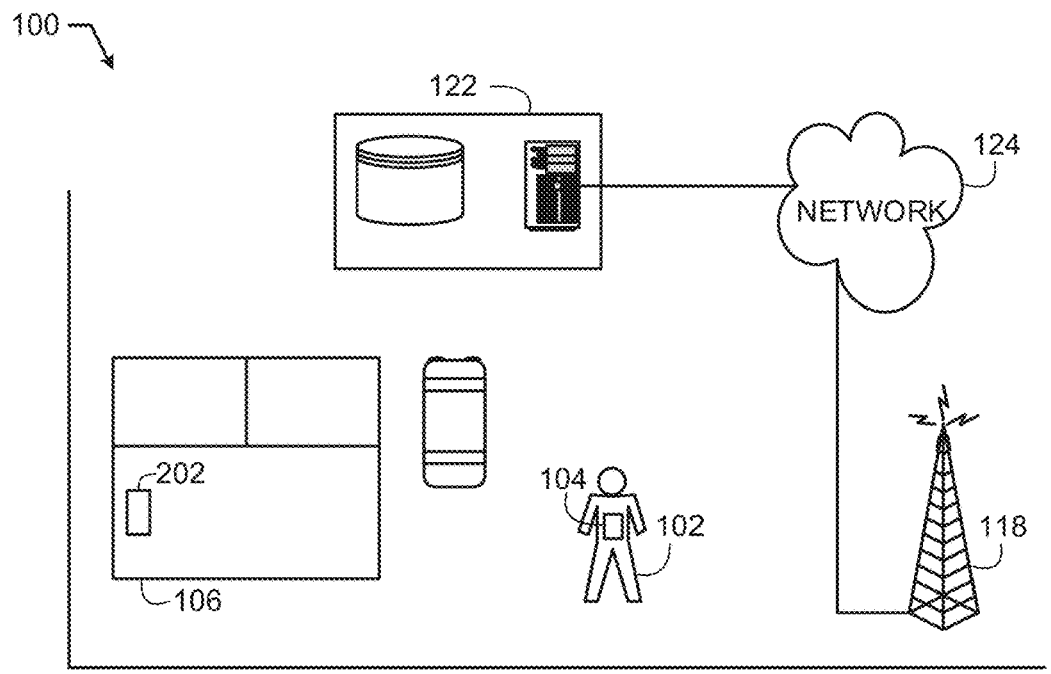
FIG. 2 is a plan view of a portion of the example geographic area of FIG. 1.
Figure 2:
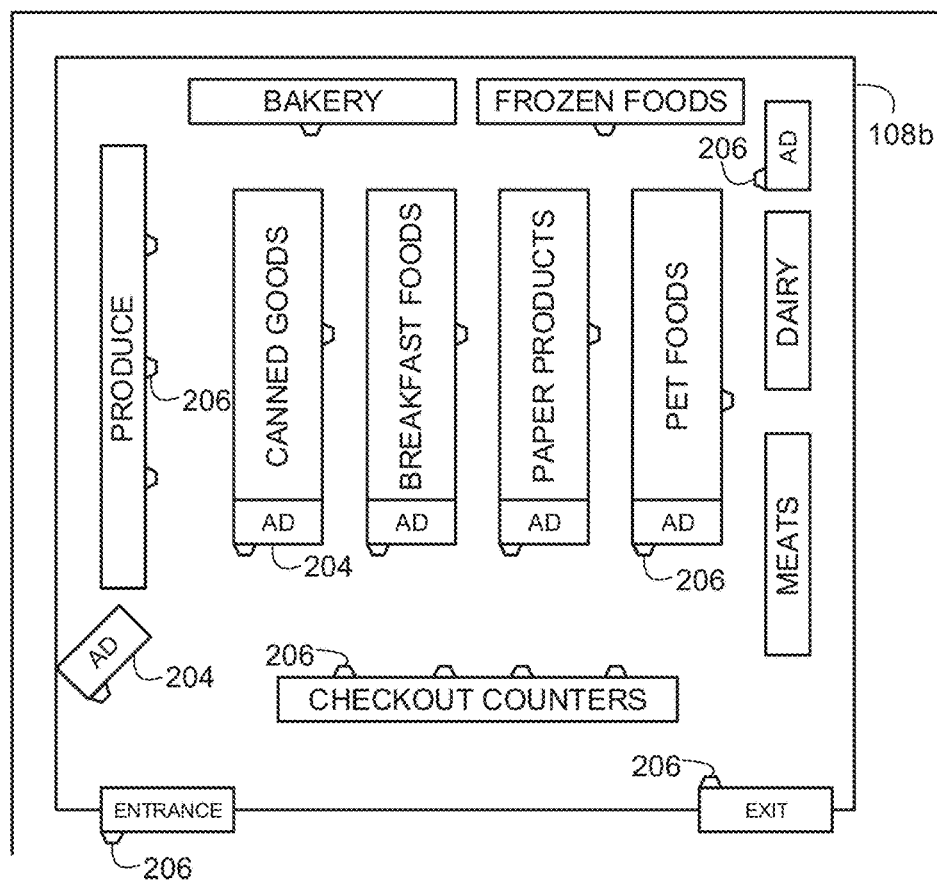

FIG. 2 is a plan view of the household 106 and the retail store 108b of the example geographic area 100 of FIG. 1. In the illustrated example, the household 106 includes a television 202 that can expose the survey respondent 102 to advertisements and/or television programming, for which the portable device 104 can generate media exposure information. The retail store 108b stocks products for sale and also includes advertisements 204 to which the survey respondent 102 can be exposed when walking through the retail store 108b. In the illustrated example, the retail store 108b includes a plurality of chirpers 206 (e.g., signal emitters) to emit codes that are unique to each advertisement 204. In this manner, when the survey respondent 102 is in close enough proximity to one of the chirpers 206 to be exposed to a respective product or advertisement, the portable device 104 detects a chirp 206 which can be used to identify the product or advertisement to which the respondent 102 was exposed and, thus, to generate media exposure information. As shown, some of the chirpers 206 may be located at an entrance and/or an exit of the retail store 108b to log when survey respondents enter and/or exit the retail store 108b. By analyzing the Doppler Effect associated with the detected chirps, the direction (into or out of) of movement (e.g., walking direction) of the respondent can be determined. Some of the chirpers 206 may be located at the check out counters 208 to determine when respondents are at a point-of-sale location. In this manner, survey questions related to purchases or products or advertisements to which respondents were exposed can be presented to respondents when the respondents are checking out or have left the retail store 108b. As the respondent 102 moves through the household 106, the retail establishment 108b, and/or any other monitored place in the geographic area 100, the portable device 104 collects activity information (e.g., location information, motion information, media exposure information, etc.) and communicates that activity information to the central facility 122. The central facility 122 analyzes the received activity data to select survey questions relevant to the activities of the respondent 102. Alternatively or additionally, logic (e.g., hardware, firmware and/or software) on the portable device may select and display the survey questions (e.g., without involving the central facility). The survey questions may be selected in real time or near real time to respond to "hot" client requests for immediate information resulting from any trigger (e.g., new product release, weather, host/spokesman/on-air personality closely associated with the product who has suffered negative publicity tarnishing his/her reputation, etc.).

Figure 3:
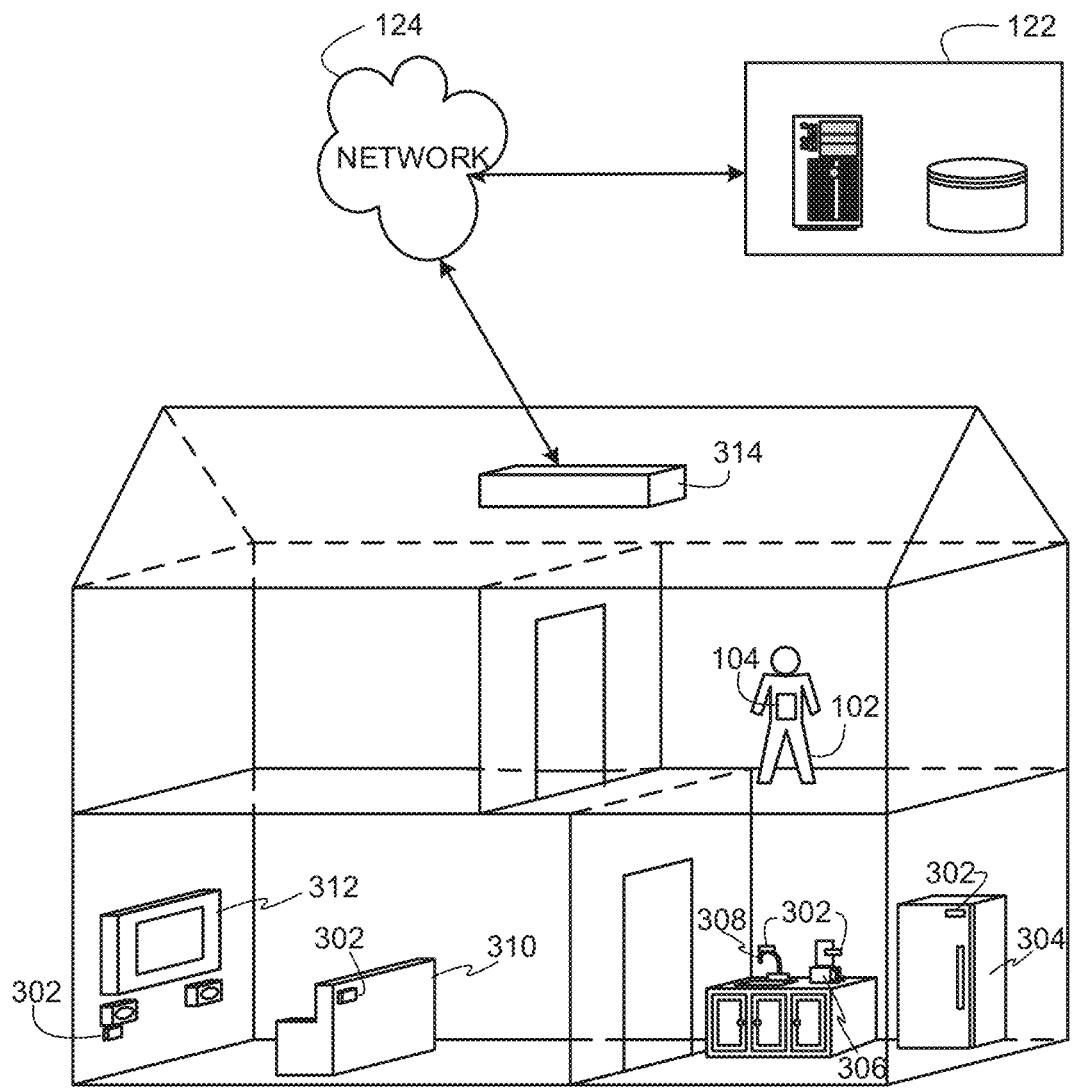
FIG. 3 is an interior view of a home in which activity sensors can be placed to monitor activities of household members.

FIG. 3 is a partial interior view of the household 106 of FIGS. 1 and 2 in which activity sensors 302 are placed to monitor activities of household members (e.g., the survey respondent 102). Each activity sensor 302 can be implemented as a wireless tag that includes a battery, a transmitter, a microprocessor, and one or more of a plurality of different types of sensors. The sensors may be, for example, motion sensors, acoustic sensors, light sensors, electro-magnetic field sensors, etc. that detect when different household items are being used within the household 106 by household members (or guests). Each activity sensor 302 can be attached to a different household item to detect when that household item is in use. The activity sensors 302 can be relatively small (e.g., about half or a quarter of the size of a credit card) and can be affixed to products, cupboards, doors, appliances, chairs, under-sink water pipes, remote controls, computer keyboards, etc. The activity sensors 302 can be used to generate time and/or date stamped activity information indicative of usage of different household items and which can be used to correlate the usages with other household activities (e.g., When and how variable are mealtimes? Which family members eat what meals together? How long is preparation time prior to leaving the house for work or school? Are there any patterns in the order/timing of when household members leave from or return to the home? How often and when are the stove, microwave, refrigerator, etc. used? When is house cleaning done and what products/devices are used for that cleaning?). Additionally or alternatively, the sensor data can be used to detect directly (by audio, RF, infrared signal(s), etc.) the respondent's proximity to others in the room or coverage area space. Additionally or alternatively, by attaching a sound and/or vibration sensor under an eating surface, analysis of detected clicks can be used to determine the number of people eating. Further, signature patterns of these detected clicks can be used to determine which family members are eating.

In the illustrated example, the activity sensors 302 are attached to a refrigerator 304, a coffee maker 306, a kitchen faucet 308, a couch 310, and an entertainment system 312. The type of sensor used for the refrigerator 304 may be a motion sensor, the type of sensor used for the coffee maker 306 may be an electro-magnetic field sensor or a temperature sensor, the type of sensor used for the faucet 308 may be an acoustic sensor, the type of sensor used for the couch 310 may be a motion sensor, and the type of sensor used for the entertainment system 312 may be an acoustic sensor.

When one of the activity sensors 302 detects that its respective household item is in use, it transmits activity notification information to a household data collection unit 314 which, in turn, communicates the activity information to the central facility for subsequent processing to select survey questions relevant to the activities of the household member(s) (e.g., the respondent 102). In the illustrated example, each household member is provided with a respective portable device substantially similar or identical to the portable device 104. To associate activities within the household 106 with respective household members, the activity information generated by the activity sensors 302 may be timestamped and location stamped (with a location identifier indicative of a location within which each of the activity sensors 302 is located). Similarly, location information generated by the portable devices of the household members can be timestamped. In this manner, the timestamped location information generated by the portable devices can be compared to the timestamped and location stamped activity information generated by the activity sensors 302 to determine which household member was involved in which particular activity(ies). This information facilitates communicating relevant survey questions to the correct household members.

Figure 4:
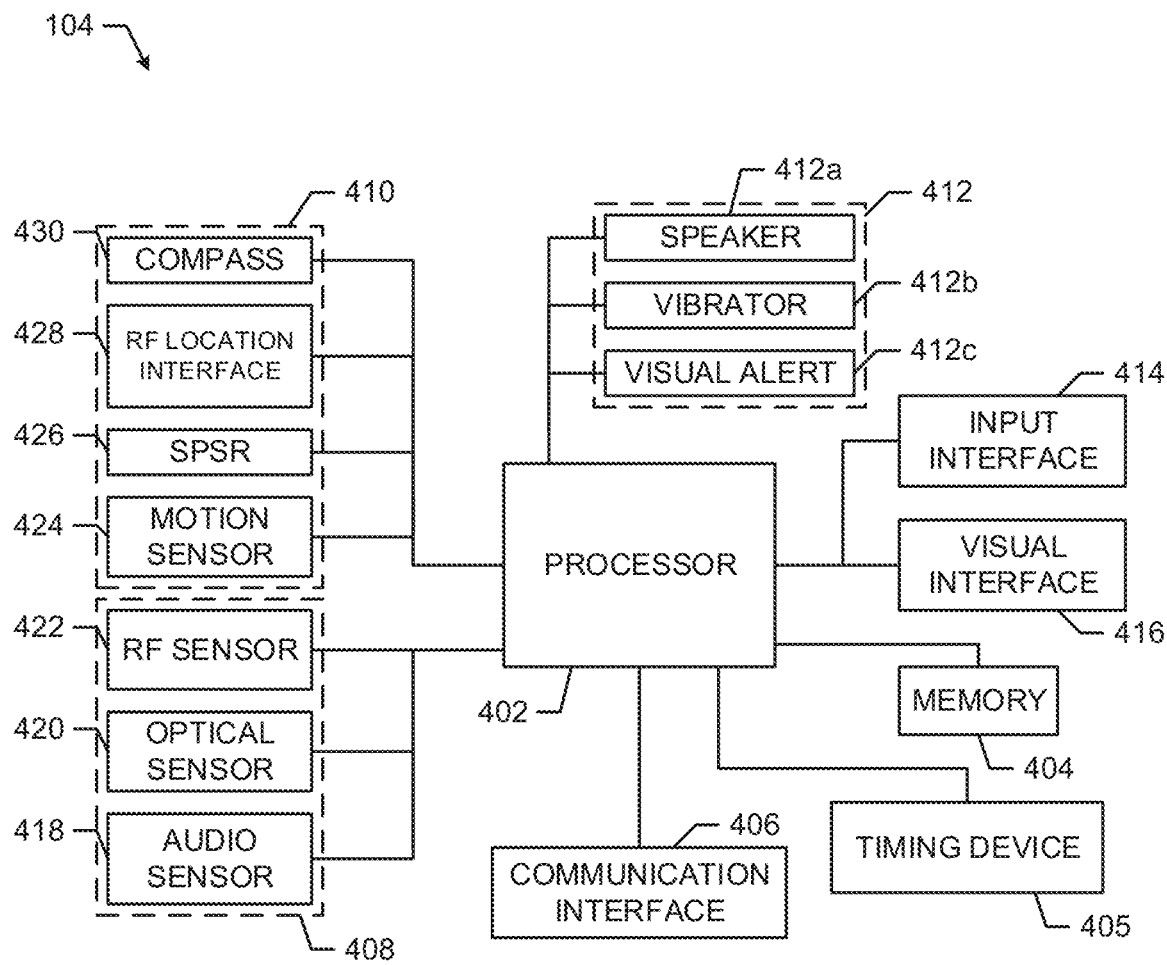
FIG. 4 is a block diagram of an example apparatus that may be used to implement a portable metering and survey device that can be worn or carried by a person to monitor the activities of the person and present surveys to the person.

FIG. 4 is a block diagram of an example implementation of the portable metering and survey device 104 of FIGS. 1-3 to monitor the activities of the survey respondent 102 and present survey questions to the respondent 102. In general, the portable device 104 includes electronic components configured to detect and collect activity information (e.g., location information, motion information, movement information, media exposure information, etc.) and communicate the activity information to the central facility 122 (FIGS. 1-3) for subsequent analyses. As shown in FIG. 4, the portable device 104 includes a processor 402, a memory 404, a timing device 405, a communication interface 406, a plurality of media monitoring information sensors 408, a plurality of location and motion sensors 410, a plurality of output devices 412, an input interface 414, and a visual interface 416, all of which are communicatively coupled as shown. In other example implementations, some of these components may be omitted, other components may be added, and/or two or more of some of the illustrated components may be provided.

The processor 402 may be any processor suitable for controlling the portable device 104 and managing or processing monitoring data related to detected media exposure or presentation information, location information, and/or motion information. For example, the processor 402 may be implemented using a general purpose processor, a digital signal processor, or any combination thereof. The processor 402 may be configured to perform and control different operations and/or features of the portable device 104 such as, for example, setting the portable device 104 in different operating modes, controlling a sampling frequency for collecting activity information, managing communication operations with other processor systems (e.g., the central facility 122 of FIGS. 1-3), selecting location information systems (e.g., the RF transceiver tower 108, the satellite 120, etc.), selecting the next set of preloaded survey questions based on collected data, etc.

The memory 404 of the illustrate example is used to store collected activity information, program instructions (e.g., software, firmware, etc.), and/or any other data or information required to operate the portable device 104. For example, after collecting activity information, the processor 402 time stamps the information and stores the time stamped information in the memory 404. The memory 404 may be implemented using any suitable volatile and/or non-volatile memory including a random access memory (RAM), a read-only memory (ROM), a flash memory device, a hard drive, an optical storage medium, etc. In addition, the memory 404 may be implemented by any removable or non-removable storage medium.

The timing device 405 of the illustrated example is implemented using a clock (e.g., a real-time clock), a timer, a counter, the clock date available from the cell phone, GPS system, the TV transmission, or any combination thereof. The timing device 405 is used to generate timestamps or to implement any timing operations. Although the timing device 405 is shown as separate from the processor 402, in some implementations the timing device 405 may be integrated with the processor 402.

The communication interface 406 of the illustrated example is used to communicate information between the portable device 104 and other systems such as, for example, the central facility of FIGS. 1-3. The communication interface 406 may be implemented using any type of suitable wired or wireless transmitter and receiver or a transceiver that have bidirectional communication capabilities including, for example, a Bluetooth transceiver, an 802.11 transceiver, a cellular communications transceiver, an optical communications transceiver, etc.

The media monitoring information sensors 408 of the illustrated example include an audio sensor 418, an optical sensor 420, and an RF sensor 422. Using the audio sensor 418, the optical sensor 420, and/or the RF sensor 422, the example portable device 104 observes the environment in which the audience member 106 is located and monitors for media (e.g., advertisements, products, television/radio programming, etc.) and/or signals associated with media. When media presentations are detected via, for example, media identifier codes, the example portable device 104 logs or stores a representation of the media content in the memory 404 and/or identifies the media content, along with the time at which the media content is detected.

The audio sensor 418 may be, for example, a condenser microphone, a piezoelectric microphone or any other suitable transducer capable of converting audio information into electrical information. The optical sensor 420 may be, for example, a light sensitive diode, an infrared (IR) sensor, a complimentary metal oxide semiconductor (CMOS) sensor array, a charge-coupled diode (CCD) sensor array, etc. The RF sensor 422 may be, for example, a Bluetooth transceiver, an 802.11 transceiver, an ultrawideband RF receiver, and/or any other RF receiver and/or transceiver. While the example portable device 104 includes the audio sensor 418, the optical sensor 420, and the RF sensor 422, the example portable device 104 need not include all of the sensors 418, 420, and 422. For example, the audio sensor 418 is sufficient to detect audio-based media identifier codes. Additionally, the optical sensor 420 is sufficient to identify program content via image pattern recognition. However, because video monitoring generally requires a line of sight between the portable device 104 and the media delivery device, one particularly advantageous example includes the audio sensor 418 and the optical sensor 420.

The location and motion sensors 410 of the illustrated example are configured to detect location-related information, motion-related information, and/or movement-related information and to generate corresponding signals that are communicated to the processor 402 to generate activity information. More specifically, the location and motion sensors 410 of the illustrated example include a motion sensor 424, a satellite positioning system (SPS) receiver 426, an RF location interface 428, and a compass 430.

Some of the location and motion sensors 410 may be configured to receive location-related information (e.g., encoded information, pluralities of fragmented information, etc.) and to perform any processing necessary to convert the received information to location information that indicates the geographic position at which the portable device 104 is located. The motion sensor 424 of the illustrated example is used to detect relatively small body movements of people (e.g., the survey respondent 102), generate motion information related to the body movements, and communicate the motion information to the processor 402. The motion sensor 424 may be implemented using any suitable motion detection device such as, for example, a mercury switch, a trembler, a piezo-gyroscope integrated circuit (IC), an accelerometer IC, etc. The motion information generated by the motion sensor 424 may be used to determine if the survey respondent 102 is wearing or carrying the portable device 104 and when the survey respondent 102 is active and/or inactive.

The SPS receiver (SPSR) 426 of the illustrated example is implemented using a global position system (GPS) receiver and is configured to generate location information based on encoded GPS signals received from GPS satellites. In general, the SPS receiver 426 may be used by the portable device 104 to collect location information in outdoor environments.

The RF location interface 428 of the illustrated example is implemented using a receiver or a transceiver and is used to receive location-related signals or information from location information systems such as, for example, the RF transceiver tower 108. The RF location interface 428 may be implemented using any suitable RF communication device including, for example, a cellular communication transceiver, a Bluetooth transceiver, an 802.11 transceiver, an ultrawideband RF transceiver, etc. In addition, the RF location interface 428 may be implemented using only an RF receiver. Examples of location-based technologies that may be implemented in cooperation with the RF location interface 428 include the Ekahau Positioning Engine™ by Ekahau, Inc. of Saratoga, Calif., United States of America, an ultrawideband positioning system by Ubisense, Ltd. of Cambridge, United Kingdom or any of the ultrawideband positioning systems designed, sold and/or patented by Multispectral Solutions, Inc. of Germantown, Md., United States of America. Ultrawideband positioning systems, depending on the design, offer advantages including longer battery life due to lower power consumption, greater precision and such systems tend to use less of the available signal spectrum.

The Ekahau Positioning Engine™ may be configured to work with a plurality of stationary wireless communication protocol base units (e.g., 802.11, Bluetooth, etc.) to broadcast location-related information. By implementing the RF location interface 428 using a suitable wireless communication protocol device and communicatively coupling stationary base units (not shown) to the RF location interface 428 using the same communication protocol, the Ekahau Positioning Engine™ may be used to generate location information. In particular, location-related information may be transmitted from the stationary base units, received by the RF location interface 428, and used to generate location information using Ekahau Positioning software offered by Ekahau, Inc.

The Ubisense ultrawideband system may be used by providing a plurality of stationary ultrawideband transmitters (not shown) and implementing the RF location interface 428 using an ultrawideband receiver. In this manner, the RF location interface 428 can receive ultrawideband location-related information that is broadcast from the stationary ultrawideband transmitters so that the portable device 104 can generate location information based on the received ultrawideband signals.

The compass 430 of the illustrated example is implemented using a magnetic field sensor, an electronic compass IC, and/or any other suitable electronic circuit. In general, the compass 430 may be used to generate direction information, which may be useful in determining the direction in which a person (e.g., the survey respondent 102) is facing. The direction information may be used to determine if a person is facing a television to enable consumption of and/or exposure to a television program. The direction information may also be used to determine if a person is facing, for example, a billboard advertisement so that when the portable device 104 receives an RF identification signal corresponding to the billboard advertisement and location information indicating that the survey respondent 102 is in front of the billboard, the direction information from the compass 430 may be used to determine if the survey respondent 102 is facing the billboard. In this manner, the portable device 104 can generate media exposure information indicating that the survey respondent 102 was exposed to the billboard content if the respondent actually faced (and, thus, likely saw) the billboard.

An example positioning technology that may be used in combination with the compass 430, the motion sensor 424, and the SPS receiver 426 is the Dead-Reckoning Module (DRM®) produced and sold by Honeywell International Inc. of Morristown, N.J. The DRM® is configured to enable generation and/or collection of location information within buildings (e.g., the household 106 of FIGS. 1-3) and in outdoor environments. In general, when used outdoors, the DRM® uses GPS technology to collect location information. When used indoors, the DRM® uses, among other components, a compass (e.g., the compass 430) and an accelerometer (e.g., the motion sensor 424) to generate location information.

The plurality of output devices 412 of the illustrated example are used to, for example, capture the attention of or alert survey respondents (e.g., the survey respondent 102), to present survey questions to audience members and/or to request input from survey respondents. The plurality of output devices 412 of the illustrated example includes a speaker 412a, a vibrator 412b, and a visual alert 412c.

The portable device 104 of the illustrated example also includes the input interface 414, which may be used by a survey respondent (e.g., the survey respondent 102) to input information to the portable device 104. For example, the input interface 414 may include one or more buttons or a touchscreen that may be used to enter information, set operational modes, turn the portable device 104 on and off, etc. In addition, the input interface 414 may be used to enter portable device settings information, survey respondent identification information, etc.

The portable device 104 of the illustrated example further includes the visual interface 416, which may be used in combination with the input interface 414 to enter and retrieve information from the portable device 104. For example, the visual interface 416 may be implemented using a liquid crystal display (LCD) that, for example, displays detailed status information, location information, configuration information, calibration information, etc. The visual interface 416 may, alternatively or additionally, include light-emitting diodes (LEDs) that convey information including, for example, status information, operational mode information, etc.

Figure 5:
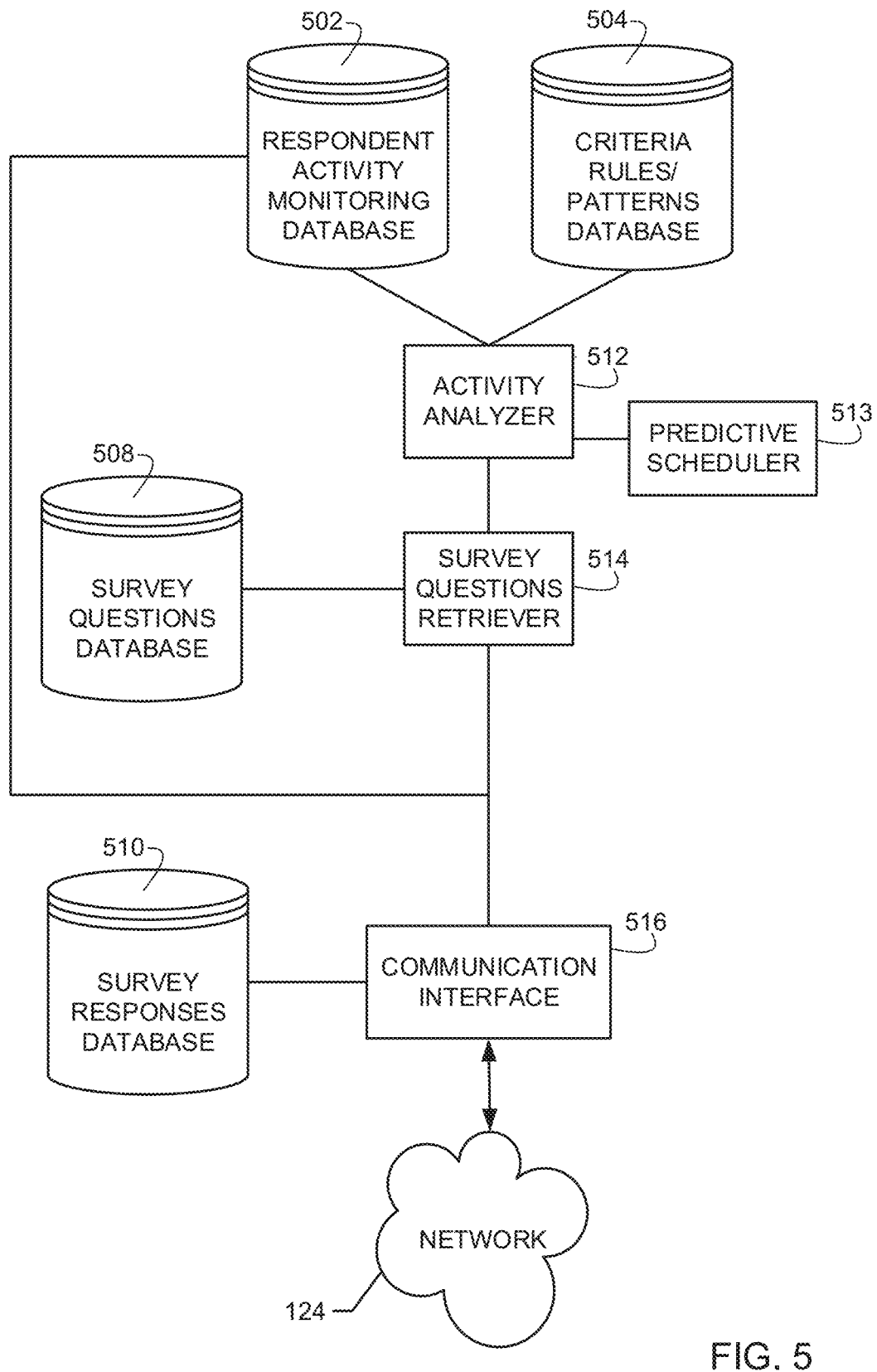
FIG. 5 is a block diagram of an example system that may be used to dynamically select survey questions to be presented to individual persons based on those persons' activities.

FIG. 5 is a block diagram of an example system 500 that may be used to dynamically select survey questions to be presented to individual persons based on each person's activities. The example system 500 is implemented in the central facility 122 (FIGS. 1-3). The example system 500 can be implemented using any combination of software, firmware and/or hardware. To store the respondent activity information that can be reported by the portable device 104 (FIGS. 1-4) and/or the activity sensors 302 (FIG. 3), the example system 500 is provided with a respondent activity monitoring database 502. In the illustrated example, the respondent activity monitoring database 502 stores identifiers for different advertisements or products to which the survey respondent 102 has been exposed. The respondent activity monitoring database 502 stores use data indicative of use of the houseware item(s) of FIG. 3. The respondent activity monitoring database 502 also stores travel pattern information indicative of different travel routes and travel modes that the respondent 102 has taken/utilized when moving between different locations including, for example, walking, local driving, long-distance driving, mass transit, air travel frequency and/or destinations (including an automatic determination of frequent flyer/non-frequent flyer status), etc. This is not an exhaustive list. The respondent activity monitoring database 502 may include many other types of monitoring data of interest including activities (e.g., sleep, exercise, shopping, etc.) of the respondent 102, locations at which the respondent 102 has been, media to which the respondent 102 has been exposed, etc.

To specify the conditions under which particular survey questions should be selected, the example system 500 is provided with a criteria rules/patterns database 504. The criteria rules/patterns database 504 stores rules or patterns that specify combinations of activities that a person (e.g., the survey respondent 102) must perform to activate particular survey questions that are relevant to that person. For example, the criteria rules/patterns database 504 may store a rule specifying that when a person performs a particular activity (represented by an activity criterion in the respondent activity criterion database 502) a predetermined number of times or in combination with another particular activity being performed a predetermined number of times, a particular survey or surveying question(s) should be presented to the person.

To store survey question for possible presenting to survey respondents, the example system 500 is provided with a survey questions database 508. To store survey responses received from survey respondents, the example system 500 is provided with a survey responses database 510.

To analyze respondent activity monitoring data, the example system is provided with an activity analyzer 512. The activity analyzer 512 compares respondent activity information stored in the respondent activity monitoring database 502 to rules or patterns in the criteria rules/patterns database 504 to determine when to select survey questions and which survey questions to select for each survey respondent participating in a survey program. In some examples, the respondent activity information may be updated (e.g., in real-time) and used to form a predictive schedule of the respondent's activity, which is discussed in greater detail below. The predictive schedule may be generated by a predictive scheduler 513 that, for example, may be coupled to or integral with the activity analyzer 512.

To obtain survey questions based on the analyses performed by the activity analyzer 512, the example system 500 is provided with a survey questions retriever 514. When the activity analyzer 512 determines that activity information in the respondent activity monitoring database 502 meets one or more of the rules or patterns in the criteria rules/patterns database 504, the activity analyzer 512 communicates a survey question identifier specified by that rule or pattern to the survey question retriever 514. In turn, the survey question retriever 514 accesses the survey question database 508 to retrieve or obtain the survey question corresponding to the received survey question identifier and communicates the retrieved survey question to a communication interface 516.

The communication interface 516 communicates survey questions to portable devices (e.g., the portable device 104) of survey respondents. As discussed above, the portable devices may be implemented using a cellular mobile telephone. The cellular mobile telephone may be provided with software that causes it to emit a unique audible alert that can be distinguished by a person as indicating that a survey question has been received and is ready for presentation. The survey questions may be presented in the form of, for example, an email message, at text message, an instant message, etc. The communication interface 516 also receives responses from survey respondents provided via their portable devices. The communication interface 516 stores the responses in the survey responses database 510 for subsequent analysis. The communication interface 516 is also configured to receive activity information from the portable device 104 and the household data collection unit 314 and to store the activity information in the respondent activity monitoring database 502.

Figure 6A:
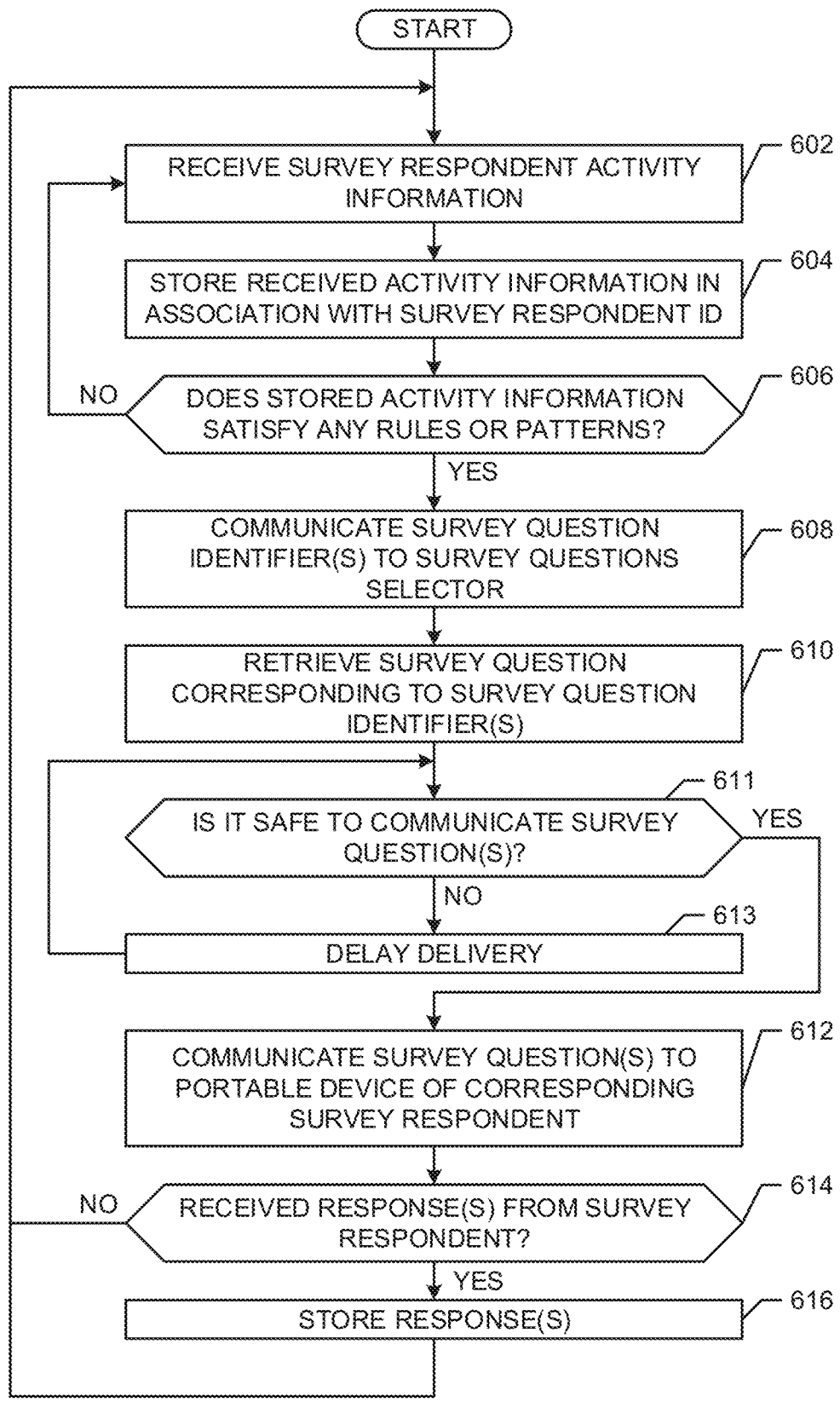
FIG. 6A is a flow chart representative of example machine readable instructions that may be executed to implement the example system of FIG. 5 to dynamically select survey questions based on respondent activities.
Figure 6B:
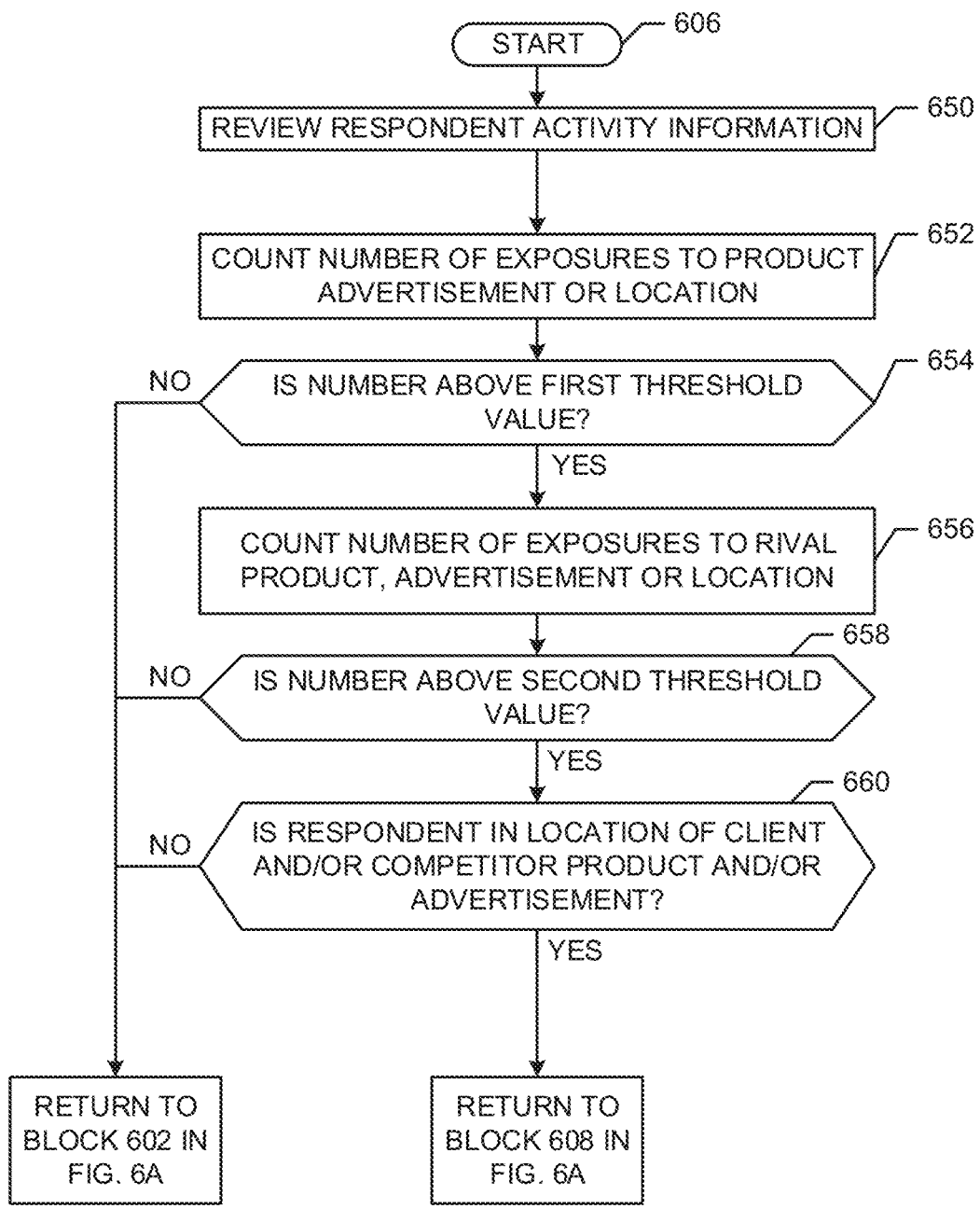
FIG. 6B is a flow chart representative of example machine readable instructions that may be executed to implement block 606 of FIG. 6A.

While an example manner of implementing the example system of FIG. 5 has been illustrated in FIGS. 6A and 6B, one or more of the elements, processes and/or devices illustrated in FIGS. 6A and 6B may be combined, divided, re-arranged, omitted, eliminated and/or implemented in any other way. Further, the example processor 402, the example memory 404, the example timing deice 405, the example communication interface 406, the example media monitoring information sensors 408, the example location and motion sensors 410, the example output devices 412, the example speaker 412a, the example vibrator 412b, the example visual alert 412c, the example input interface 414, the example visual interface 416, the example audio sensor 418, the example optical sensor 420, the example RF sensor 422, the example motion sensor 424, the example SPSR 426, the example RF location interface 428, the example compass 430, the example respondent activity monitoring database 502, the example criteria rules/patterns database 504, the example survey questions database 508, the example survey responses database 510, the example activity analyzer 512, the example questions retriever 514, the example communication interface 516 and/or, more generally, the example portable device 104 and/or the example system 500 of FIGS. 4 and/or 5 may be implemented by hardware, software, firmware and/or any combination of hardware, software and/or firmware. Thus, for example, any of the example processor 402, the example memory 404, the example timing deice 405, the example communication interface 406, the example media monitoring information sensors 408, the example location and motion sensors 410, the example output devices 412, the example speaker 412a, the example vibrator 412b, the example visual alert 412c, the example input interface 414, the example visual interface 416, the example audio sensor 418, the example optical sensor 420, the example RF sensor 422, the example motion sensor 424, the example SPSR 426, the example RF location interface 428, the example compass 430, the example respondent activity monitoring database 502, the example criteria rules/patterns database 504, the example survey questions database 508, the example survey responses database 510, the example activity analyzer 512, the example questions retriever 514, the example communication interface 516 and/or, more generally, the example portable device 104 and/or the example system 500 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example processor 402, the example memory 404, the example timing deice 405, the example communication interface 406, the example media monitoring information sensors 408, the example location and motion sensors 410, the example output devices 412, the example speaker 412a, the example vibrator 412b, the example visual alert 412c, the example input interface 414, the example visual interface 416, the example audio sensor 418, the example optical sensor 420, the example RF sensor 422, the example motion sensor 424, the example SPSR 426, the example RF location interface 428, the example compass 430, the example respondent activity monitoring database 502, the example criteria rules/patterns database 504, the example survey questions database 508, the example survey responses database 510, the example activity analyzer 512, the example questions retriever 514, the example communication interface 516 and/or, more generally, the example portable device 104 and/or the example system 500 are hereby expressly defined to include a tangible medium such as a memory, DVD, CD, etc. storing the software and/or firmware. Further still, the example portable device 104 of FIG. 4 and/or example system 500 of FIG. 5 may include one or more elements, processes and/or devices in addition to, or instead of, those illustrated in FIGS. 4 and/or 5, and/or may include more than one of any or all of the illustrated elements, processes and devices.

Figure 7:
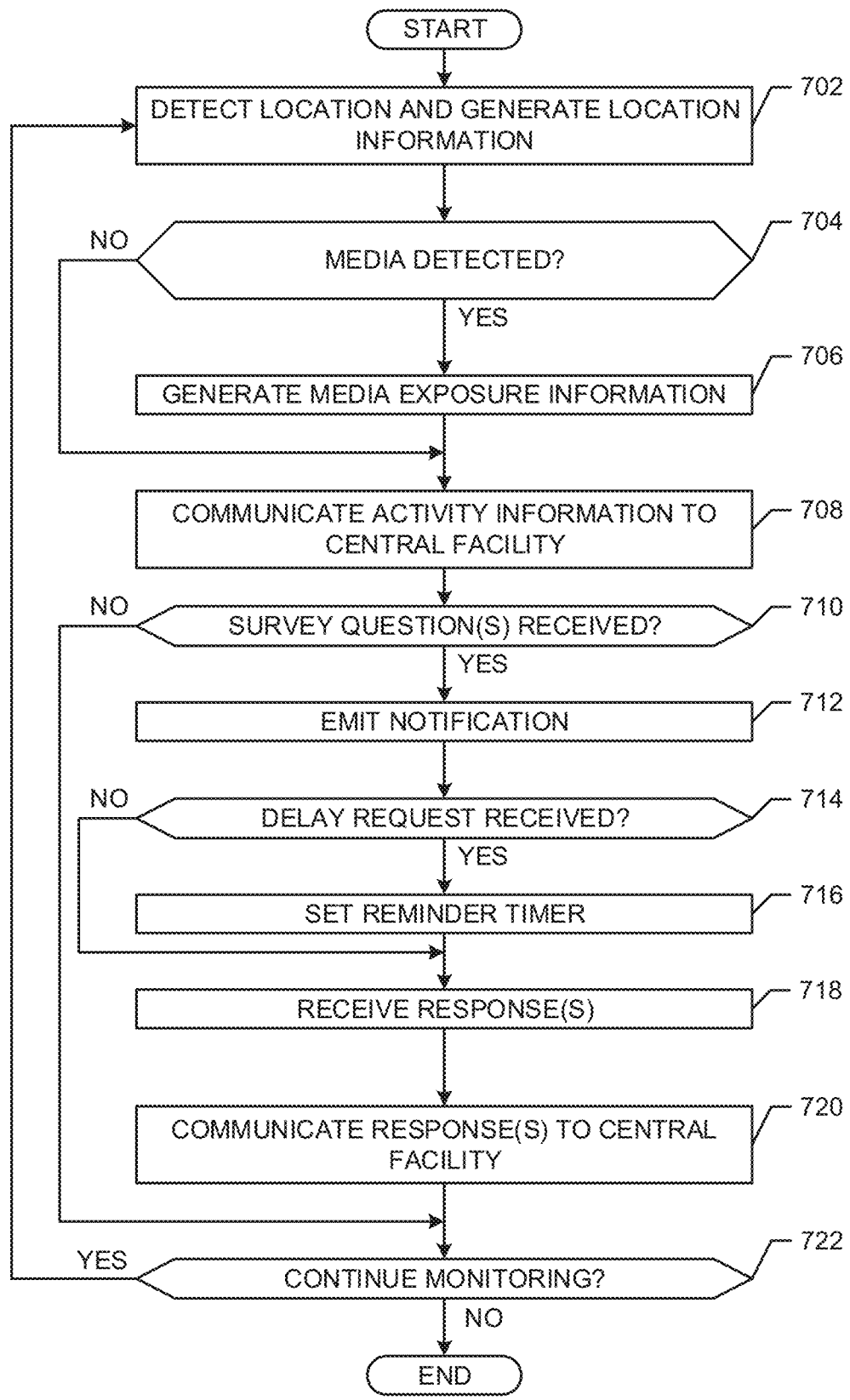
FIG. 7 is a flow chart representative of example machine readable instructions that may be executed to implement the example portable device of FIGS. 1-4 to collect activity information and present survey questions to a survey respondent.

A flowchart representative of example machine readable instructions for implementing the system 500 of FIG. 5 is shown in FIGS. 6A and 6B. A flowchart representative of example machine readable instructions for implementing the portable device 104 of FIG. 4 is shown in FIG. 7. In these examples, the machine readable instructions comprise a program for execution by a processor such as the processor 812 shown in the example computer 800 discussed below in connection with FIG. 8. The program may be embodied in software stored on a tangible medium such as a CD-ROM, a floppy disk, a hard drive, a digital versatile disk (DVD), DVD-ROM, blu-ray disk, blu-ray ROM, BD-ROM or a memory associated with the processor 812, but the entire program and/or parts thereof could alternatively be executed by a device other than the processor 812 and/or embodied in firmware or dedicated hardware in a well known manner. For example, any or all of the example processor 402, the example memory 404, the example timing deice 405, the example communication interface 406, the example media monitoring information sensors 408, the example location and motion sensors 410, the example output devices 412, the example speaker 412a, the example vibrator 412b, the example visual alert 412c, the example input interface 414, the example visual interface 416, the example audio sensor 418, the example optical sensor 420, the example RF sensor 422, the example motion sensor 424, the example SPSR 426, the example RF location interface 428, the example compass 430, the example respondent activity monitoring database 502, the example criteria rules/patterns database 504, the example survey questions database 508, the example survey responses database 510, the example activity analyzer 512, the example questions retriever 514, the example communication interface 516 and/or, more generally, the example portable device 104 and/or the example system 500 etc. could be implemented by software, hardware, and/or firmware. Further, although the example program is described with reference to the flowcharts illustrated in FIGS. 6A, 6B and 7, many other methods of implementing the example system 500 and/or the example portable device 104 may alternatively be used. For example, the order of execution of the blocks may be changed, and/or some of the blocks described may be changed, eliminated, or combined.

FIG. 6A is a flow chart representative of example machine readable instructions that may be executed to implement the example system 500 of FIG. 5 to dynamically select survey questions based on respondent activities. In the example of FIG. 6A, the communication interface 516 (FIG. 5) receives activity information from the portable device 104 (FIGS. 1-4) and the household data collection unit 314 (FIG. 3) (block 602) and stores the activity information in the respondent activity monitoring database 502 (FIG. 5) in association with a survey respondent identifier (block 604). The activity analyzer 512 (FIG. 5) analyzes the received activity information in the respondent activity monitoring database 502 to determine whether any of the rules or patterns in the criteria rules/patterns database 504 have been satisfied or met (block 606).

FIG. 6B is a flow chart representative of example machine readable instructions that may be executed, for example by the activity analyzer 512, to implement block 606 of FIG. 6A. The process shown in FIG. 6B is just one example process that may be conducted to implement block 606. Other processes may be performed in place of or in addition to the process detailed in FIG. 6B to implement additional or alternative rules for initiating surveys. In the example shown in FIG. 6B, the activity analyzer 512 reviews the respondent activity information (block 650). When reviewing the respondent activity information, the activity analyzer 512 counts, for example via a counter (not shown), the number of exposures to a product, advertisement and/or location such as, for example, a client's product, advertisement, or a location in which a client's product or advertisement is expected to appear (block 652).

The activity analyzer 512 determines, for example via a comparator (not shown), if the number of exposures to a product, advertisement and/or location is above a first threshold value (block 654). The first threshold value may be any number including, for example, one, two, three, four, etc. If the number of exposures to a product, advertisement and/or location is not above the first threshold value, then the stored activity information does not satisfy the rule or pattern examined in FIG. 6A and control is returned to block 602 of FIG. 6A.

If the number of exposures to a product, advertisement and/or location exceeds the first threshold value, the activity analyzer 512 counts the number of exposures to a second product or advertisement such as, for example, a product or advertisement of a rival (e.g., a competitor of the client) (block 656). Exposure to an advertisement may be detected by counting recorded codes associated with the advertisement or detecting the user's presence (e.g., travel pattern history) at a location in which the rival's product or advertisement appears or is expected to appear.

The activity analyzer 512 determines if the number of exposures to a rival product, advertisement and/or location is above a second threshold value (block 658). The second threshold value may be any number including, for example, one, two, three, four, etc. The second threshold value may be the same as or different than the first threshold value. If the number of exposures to a rival product, advertisement and/or location is not above the second threshold value, then the stored activity information does not satisfy the rule or pattern tested in FIG. 6Bs (block 606 of FIG. 6A) and control is returned to block 602 of FIG. 6A.

If the number of exposures to a rival product, advertisement and/or location exceeds the second threshold value (block 658), the activity analyzer 512 determine if the respondent is in a location in which a client's and/or rival's product(s) and/or advertisement(s) are expected to appear (block 660). If the respondent is not in a location in which a client's and/or rival's product(s) and/or advertisement(s) are expected to appear, then the stored activity information does not satisfy the rule or pattern tested in FIG. 6B and control is returned to block 602 of FIG. 6A.

If the respondent is in a location in which a client's and/or rival's product(s) and/or advertisement(s) are expected to appear (block 660), then the stored activity information does satisfy the rule or pattern applied by FIG. 6B and control advances to block 608 of FIG. 6A.

Although application of a specific example rules is shown in FIG. 6B, one or more other rules may additionally or alternatively be applied.

Returning to block 606 in FIG. 6A, as noted above, if none of the rules or patterns have been met (block 606), control returns to block 602. If any of the rules or patterns have been met (block 606), the activity analyzer 512 communicates one or more survey question identifier(s) stored in association with the satisfied rule(s) or pattern(s) that have been met to the survey questions retriever 514 (FIG. 5) (block 608). In some instances only a single survey question may be triggered based on a respondent's activity, while in other cases, the respondent's activity may trigger selection of numerous survey questions. At block 608, the activity analyzer 512 can also communicate the survey respondent identifier corresponding to the activity that triggered the rule or pattern. In this manner, the communication interface 516 can use the respondent identifier to communicate selected survey questions to the portable device corresponding to the survey respondent whose activity triggered selection of the survey questions.

The survey questions retriever 514 retrieves one or more survey question(s) (block 610) from the survey questions database 508 corresponding to the survey question identifier (s) received from the activity analyzer 512. The activity analyzer 512 determines if it is safe to communicate the survey question(s) to the respondent (block 611) by, for example, reviewing the respondent's location information and the rate at which the location information is changing. If the location information is changing at a rate faster than a certain limit (e.g., faster than a human could walk or run), the rate of change of the respondent's location may indicate that the respondent is driving. If the respondent is driving, it may be unsafe to communicate survey question(s) to the respondent. The communication of the survey question(s) will thus be delayed (block 613) or otherwise suppressed. The activity analyzer 512 will continue to analyze the respondent's location information until it determines that it is safe to communicate survey question(s) (block 611).

If it is determined that it is safe to communicate survey question(s) to the respondent, the communication interface 516 communicates the survey question(s) to the portable device (e.g., the portable device 104) of the survey respondent (e.g., the survey respondent 102) corresponding to the activities that triggered selection of the survey question(s) (block 612). When the communication interface 516 receives one or more response(s) from the survey respondent (block 614), the communication interface 516 stores the response(s) in the survey responses database 510 (block 616). Control of the example process then advances to block 602. If the communication interface 516 does not receive response from the respondent (block 614), control may advance to block 602. In some example implementations, the communication interface 516 may not receive a response within a short time. For example, if the survey respondent 102 elects not to answer received survey questions immediately, there may be some delay between the time that the portable device 104 receives a survey question and the time that the survey respondent 102 submits a response. In some instances, the survey respondent 102 may wait to respond until numerous survey questions have been received.

As noted above, when no response is available for processing (block 614), control returns to block 602. When a response has been received (block 614), control advances to block 616 where the response is stored in the survey responses database (block 616). Although FIGS. 6A and 6B are illustrated as single control paths for simplicity, the machine readable instructions represented by FIGS. 6A and 6B included multiple routines or threads operating in parallel to process activity data received from respondents, determine if survey question(s) have been triggered, transmit surveys and receive survey answers.

FIG. 7 is a flow chart representative of example machine readable instructions that may be executed to implement the example portable device 104 of FIGS. 1-4 to collect activity information and present survey questions to the survey respondent 102. The portable device 104 detects a location of the survey respondent 102 and generates corresponding location information (block 702) using one or more of the location and/or motion devices described above in connection with FIG. 4. The portable device 104 then determines whether it has detected any media or subjects of interest (e.g., advertisements, audio/video presentations, products, etc.) (block 704) using, for example, any media detection devices described above in connection with FIG. 4. If media has been detected, the portable device 104 generates media exposure information indicative of the media or subject of interest to which the survey respondent 102 was exposed (block 706). After generating the media exposure information (block 706) or if media was not detected (block 704), the portable device 104 communicates activity information including the location information and/or the media exposure information to the central facility 122 (FIGS. 1-3) (block 708). In this manner, the example system 500 at the central facility 122 can analyze the activity information as described above in connection with FIG. 6A to determine whether to present a survey question to the survey respondent 102. In some examples, the portable device 104 may include the necessary logic (e.g., the processes described above with respect to FIGS. 6A and 6B) to generate or present one or more survey question(s) itself without communicating with the central facility 122. By communicating the data it collects at frequent intervals, the portable device makes it possible to present surveys at times when the respondent has recently been or is even about to be exposed to a subject (e.g., an advertisement) of interest thereby enabling collection of data reflecting the respondent's actual reaction (as opposed to remembered actions) to the subject.

If the portable device 104 receives one or more survey question(s) from the central facility 122 (block 710), or generates or presents the survey question(s) itself, the portable device 104 emits a notification sound to notify the survey respondent 102 that one or more survey questions are ready to be presented (block 712). The notification sound may be a unique ring tone or alert that the survey respondent 102 can associate with having received a survey question. In the illustrated example, the portable device 104 is configured to offer the survey respondent 102 the option to delay providing responses until some later time. If the portable device 104 receives a delay request from the survey respondent 102 (block 714), the portable device 104 sets a timer (e.g., the timing device 405 of FIG. 4) to a predetermined duration (block 716), the expiration of which will cause the portable device 104 to emit a reminder notification about the pending survey questions. In this manner, the survey respondent 102 has the option to wait to respond in case, for example, the respondent 102 is too busy to respond at a particular time. When the survey respondent 102 responds to the survey question(s) (block 716), the portable device 104 communicates the response(s) to the central facility 122 (e.g., via an email, text message, or any other communication vehicle) (block 718).

After communicating the response(s) to the central facility 122 at block 720 or if no survey questions were received at block 710, the portable device 104 determines whether it should continue monitoring (block 720). For example, if the portable device 104 is still powered on and the survey processes have not been disabled, the portable device 104 determines that it should continue monitoring and control returns to block 702. Otherwise, the example process of FIG. 7 is ended.

Figure 8:
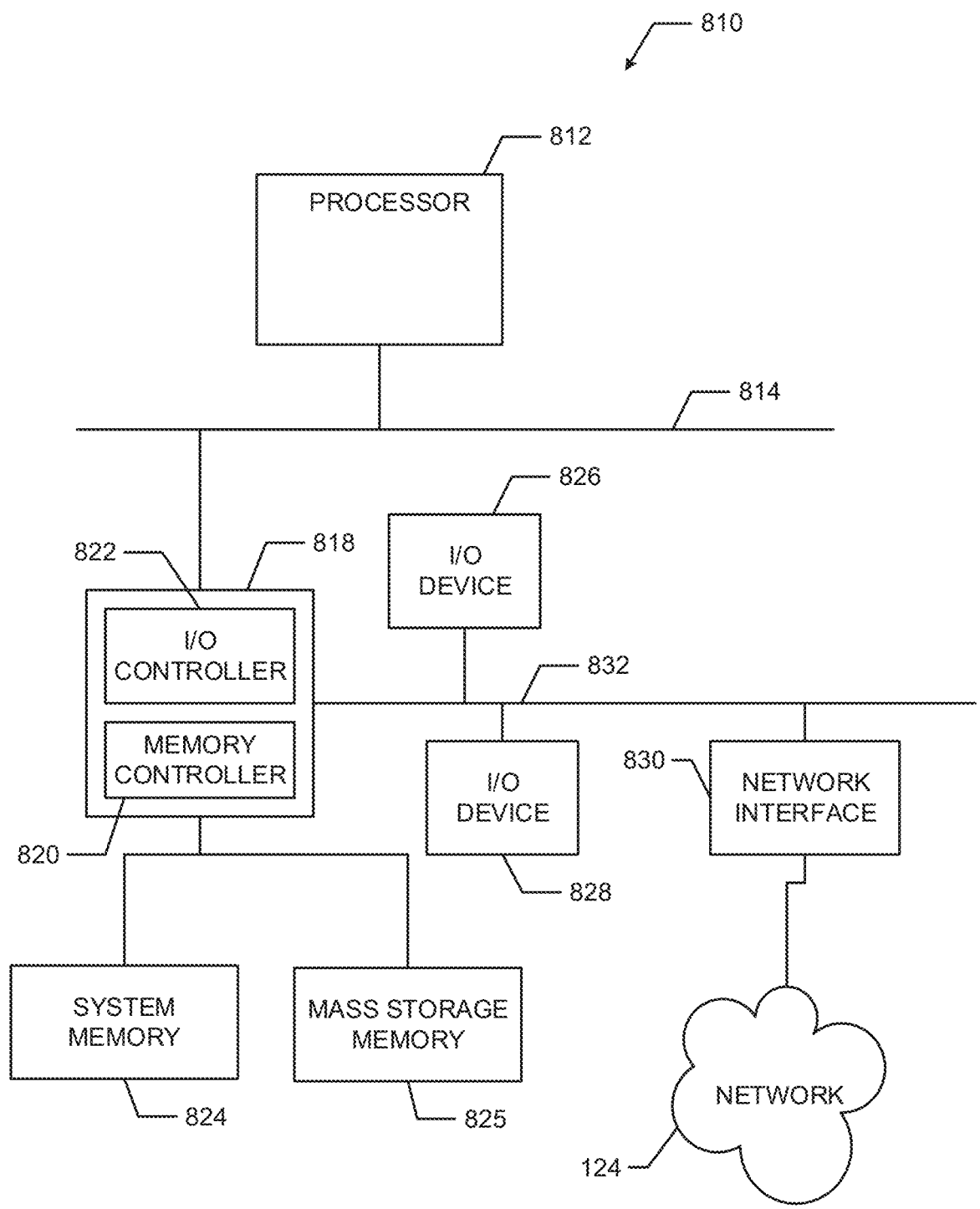
FIG. 8 is a block diagram of an example processor system that may be used to implement the methods and apparatus described herein.

FIG. 8 is a block diagram of an example processor system 810 that may be used to execute the example machine readable instructions of FIGS. 6A, 6B and 7 to implement the example apparatus, systems, and/or methods described herein. As shown in FIG. 8, the processor system 810 includes a processor 812 that is coupled to an interconnection bus 814. The processor 812 may be any suitable processor, processing unit or microprocessor. Although not shown in FIG. 8, the system 810 may be a multi-processor system and, thus, may include one or more additional processors that are identical or similar to the processor 812 and that are communicatively coupled to the interconnection bus 814.

The processor 812 of FIG. 8 is coupled to a chipset 818, which includes a memory controller 820 and an input/output (I/O) controller 822. The chipset provides I/O and memory management functions as well as a plurality of general purpose and/or special purpose registers, timers, etc. that are accessible or used by one or more processors coupled to the chipset 818. The memory controller 820 performs functions that enable the processor 812 (or processors if there are multiple processors) to access a system memory 824 and a mass storage memory 825.

The system memory 824 may include any desired type of volatile and/or non-volatile memory such as, for example, static random access memory (SRAM), dynamic random access memory (DRAM), flash memory, read-only memory (ROM), etc. The mass storage memory 825 may include any desired type of mass storage device including hard disk drives, optical drives, tape storage devices, etc.

The I/O controller 822 performs functions that enable the processor 812 to communicate with peripheral input/output (I/O) devices 826 and 828 and a network interface 830 via an I/O bus 832. The I/O devices 826 and 828 may be any desired type of I/O device such as, for example, a keyboard, a video display or monitor, a mouse, etc. The network interface 830 may be, for example, an Ethernet device, an asynchronous transfer mode (ATM) device, an 802.11 device, a digital subscriber line (DSL) modem, a cable modem, a cellular modem, etc. that enables the processor system 810 to communicate with another processor system.

While the memory controller 820 and the I/O controller 822 are depicted in FIG. 8 as separate blocks within the chipset 818, the functions performed by these blocks may be integrated within a single semiconductor circuit or may be implemented using two or more separate integrated circuits.

As noted above, in some examples, the respondent activity information may be updated (e.g., in real-time) and used to form a predictive schedule of the respondent's activity. In media research, certain time frames after exposure to a product/service are generally accepted and/or standardized as the optimal time for presenting a survey so that different surveys for different products can be compared in a recall analysis. These standardized recall time frames include, for example, instantly or substantially instantly, a five-hour recall, a five-day recall or a five-week recall. Other time frames may also be standardized. Using the predictive scheduling capabilities, the example methods and systems described herein can recognize that at a particular recall time interval, a respondent may or may not be expected to be busy. That is, a particular recall time may not be an appropriate time to initiate a survey for a particular respondent based on a respondent's historical behavior patterns/availability. For example, a respondent that generally, if not always, drives from work to home at, for example, the five-hour recall time after a key triggering event/exposure to a product or survey trigger (which may be an optimum recall period in some examples) would likely be unable to respond to survey questions at that time. As a result, the survey questions may be slightly delayed or presented during another recall time period. Alternatively, the respondent may be dropped from the pool of respondents to be surveyed based on this predicted unavailability.

A matrix of all respondents that have met the survey triggering criteria and the respondent's predictive schedules/availabilities during their specific (but, perhaps different) standardized response times may be compiled (e.g., by the example activity analyzer 512 cooperating with the predictive scheduler 513) and used to calculate, forecast and select a likely successful pool of respondents that should be available for various time-dependent surveys (e.g., five-minute recall, five-hour recall, etc.). Based on the respondents' predicted schedules, the example processes described herein can determine which survey question(s) should be assigned or sent to which respondents to increase the likelihood of receiving responses to the survey questions, which, in turn, improves the surveying company's ability to meet the requirements of their client who wants the survey information and/or an analysis thereof. The assignment of surveys to respondents may also be based on one or more of: respondent demographic information, respondent activity information, or other criteria to best meet the client's requirements. If more than enough respondents are predicted to be available at the standard recall time(s) to meet the survey/client's desired goals, then other available respondents may not receive the survey questions but may instead be saved for other surveys or later secondary surveys (e.g., a five-day recall). Furthermore, delaying survey questions to some of the respondents decreases the likelihood that a respondent will feel overloaded during a particular time frame.

In addition, if it is determined (e.g., by the example activity analyzer 512) that one or more respondents fall within some defined tolerance based on, for example, respondent demographic information, respondent activity information, prior availability, commuting regularity and/or other criteria, these respondents may be selected to receive survey questions to form a minimum variance group for one or more recall time periods.

Furthermore, respondents in any of the examples described herein may be sent one or more survey reservations prior to an actual anticipated recall time (with or without any details of the specific nature of the survey). The respondent could accept the suggested time or offer an alternative time that may be automatically accepted/checked by the auto/predictive scheduler 513. If the respondent is not available at the requested time, other times (for examples times that would advantageously meet the client requirements) may be offered.

As noted above, the predictive schedule may be generated by a predictive scheduler 513 that, for example, may be coupled to or integral with the activity analyzer 512. In these examples, the predictive scheduler 513 and/or the activity analyzer 512 may use any or all of the example processes, predictive information and/or artificial intelligence logic as detailed herein for predicting and/or selecting in real-time respondents who have met the triggering event/exposure criteria for a real-time survey launch, but which may likely be available or not available. The predictive scheduler 513 and/or the activity analyzer 512 uses any or all of the data (e.g., including respondent activity information, availability data, etc.) to monitor, adjust and/or augment a list or determination of qualified or preferred respondents to increase the likelihood of meeting the requirements of the client. The predictive scheduler 513 and/or the activity analyzer 512 makes these determinations with minimum negative impact to the availability of respondents who have also met (or likely will meet) triggering event/exposures criteria for other survey questions, but whose characteristics may make them more difficult to obtain as survey participants. For example, depending on the recall time requirements, the predictive scheduler 513 and/or the activity analyzer 512 may not select a rare respondent (e.g., a respondent with unusual demographic characteristics) to participate in a survey for Coke, because the Coke survey likely will have an abundance of participants and this particular respondent should remain available and eligible for a second survey (e.g., a survey for expensive automobiles), which may have a more difficult time in obtaining enough participants to meet the client's requirements.

By tracking individual and/or family activity using the techniques described above, the above described methods and/or apparatus may be used to generate a dashboard or matrix reflecting individual and/or family activity throughout a monitored time period (e.g., throughout the day). An example of such a matrix is shown in FIG. 9.

The portable device 104 described above may be structured to be communicatively coupled to a laptop or desktop computer (hereinafter "general purpose computer") at the respondent's home or place of business in order to synchronize the device and/or load data to/from the device. Attachment to a general purpose computer for such a synchronization process can be used as a trigger to automatically present secondary and/or more detailed survey questions (e.g., questions relating to earlier answered questions but delving into the topic in greater detail) to the respondent. Alternatively, such secondary and/or more detailed questions can be triggered by other events and/or by manual initiation of the same.

Attachment to a general purpose computer may also trigger compilation and/or display of a simple or hierarchical/nested summary of the respondents activities for a given time period (e.g., day(s), week, month time). This summary may be in the form of the matrix shown in FIG. 9. The summary/matrix may be presented for the respondent and editable for the purpose of permitting the respondent to correct, complete, and/or supplement the collected data.

The portable device 104 of the illustrated examples can be structured to automatically and systematically release incentives/awards/points/coupons or payments to cooperative respondents to encourage continued participation.

Incentives are a huge cost component of surveys and, therefore, it is important to optimize implementing the appropriate level(s) and frequency of incentives. Such incentive programs are usually administered using broad, general triggers and wide incentive level divisions because of the overwhelming workload to individually administer such systems on a per-person level.

The above disclosed examples substantially improve the efficiency of incentives by: (a) enabling automatic generation of person-by-person incentives based on their specific performance (which is possible due to the user monitoring data collected and the survey answers provided on an individual basis; (b) enabling the detection of early signs of interest fall-off and response thereto by one or more of: (1) offering incentives, and (2) sending messages directly (e.g., generated on phone by software on the phone and/or central processor); (c) enabling immediate distribution of incentives (e.g., a discount or gift related to the physical location of the respondent at the time the inventive/gift is offered such as, for example, at the time the survey is answered) when cooperators' actions occur to thereby achieve maximum incentive impact; (d) enable experimentation with which incentive types work best on a person-by-person basis.

Incentives of any type may be used. For example, ring tones and/or music and/or coupons may be emailed by the central processor or "X % off coupons" may be displayed directly on the portable device (e.g., phone) screen.

Additionally or alternatively, the monitoring information collected by the above described portable devices may be analyzed in either real-time using, for example, on portable device algorithms or via the central facility post processing. In the latter case, the results may be automatically matched to other respondents using any type of selection/comparison algorithm(s) to detect similarities and/or differences such as, for example, physical location, age, gender, income, or positive or negative ratings data. Many other possible match criteria could alternatively or additionally be employed. These automatically matched groups can be automatically brought together in a live (or off-line) virtual network enabled administration of a joint "Smart Survey" using either their portable devices or via a self-executing email to their personal PCs where these automatically selected cooperators or collaborators are able to compare their survey results with the results of others. The cooperative respondents could also virtually interact with other cooperative respondents to jointly build a single joint group survey result. The purpose of this feature is to test firmness of opinions, susceptibility to peer/social input of a survey product, and automatically generate survey questions (e.g., follow up questions) to dive deeper into the reasons behind significant differences between large group categories. Again it is emphasized that this may all be done by automatic selection of appropriate questions for a pre-stored database of questions, thereby enabling the avoidance of costly, time consuming direct human involvement.

For example, two or more respondents, who have met a triggering event (e.g., a commercial or product exposure), may be automatically selected to participate in a cooperative or collaborative smart survey. Such a collaborative survey would allow one or more answers given by a first respondent to be presented to a second respondent as part of that second respondent's survey to solicit their reaction/response. Thus, for example, a collaborative smart survey may be sent to a known Coke drinker about a new soft drink, and his answers to that survey may be (anonymously) sent to a known Pepsi drinker for his reaction to the Coke supporter's reaction. A non smoker may be selected to react to a smoker's survey. A Republican may be selected to react to a Democrat's survey responses. A younger adult may be selected to respond to an elderly adult's results, male to female, citizen to non-citizen, various ethnicities to others, any group(s) to any other group(s), etc. In addition, any combination of criteria may be used to select respondents for collaborative smart surveys. For example, a first group of respondents who are Republicans who smoke may respond to survey questions based on the responses to a survey by Democrats who commute using their own car.

Any combination of criteria may be used. In these examples, the respondents may communicate in a one-to-one manner, two-on-one, or in an aggregate environment such as, for example, a list-serve type communication. In addition, the collaborative smart surveys may involve whole groups reacting to specific or averaged results of other whole groups or specific individuals. These examples allow a media or consumer research company to gather data without directly participating or arbitrating a discussion or debate.

The example surveys described herein may use either or both of two types of surveys, namely, closed-ended and open-ended. Closed-ended surveys offer a set of answers (e.g., three to five options of possible answers), and the respondent is asked to select the answer closest to his/her feeling/response. Because of the limited set of allowed responses with closed-ended surveys, the back office or tabulation process including the calculation of quantitative percentages, correlations, final tallies, etc. are straight forward. However, closed-ended surveys may overlook and not gather unexpected feelings or responses that were unanticipated in the design or range of allowed responses because the respondent must select within the allowed choices even though none of the choices really represents the respondent's true feelings. Thus, the respondent is forced to select a response that comes the closest to their preferred response, even though the selected response may be inaccurate.

An open-ended survey asks that the respondents enter their opinion or response in their own words. While open-ended surveys may actually come closer to the real feelings of the sampled group of respondents, the solicited responses are more difficult to later analyze because of the freedom to use variable words that represent the respondents' thoughts. Spelling and variable word choice may cause processors to misinterpret their intended meaning. Not only are the word (s) that are used important, but the sentence structure, grammar, spelling, variety of adjectives and adverbs, breadth and depth of vocabulary also reveal not just the intended opinion, ranking and/or response to the survey question, but also the level of education, observation and expression skills of the respondents. This information may be rich and meaningful feedback for the present survey or for use in developing future surveys and/or focus groups.

The example Smart Surveys described herein may implement smart text analytics. Smart text analytics employ text analytics that provide real-time forensics of a respondent's initial open-ended text responses. Based on that analysis the Smart Survey adjusts to a similar writing style by auto-formatting subsequent questions. Smart text is implemented on an on-going basis through the survey. Not only is the writing style adjusted, but the level of detail requested may also be increased or decreased. For example, a respondent volunteering to type a three sentence response to a question and offering more and/or fine line detail beyond the initial focus of the question reveals that this respondent has a willingness, ability, and time to offer more significant insights to the subject matter questioned. The example Smart Surveys and smart text analytics can auto-engage such a respondent to greater depths with acceptable risks. Further, if asking more detail begins to result in increased survey dropout rates, the auto-test analytics may self-adjust to further limit depth of questions, length of remaining survey, and/or reorder remaining question areas so as to maximize depth of feedback without losing the respondent.

Additionally or alternatively, to facilitate entry in the live/mobile environment, the portable devices described above may employ many input friendly features/capabilities. Such features include icons (like smiley faces, dollar signs, $, etc.) and specific feedback sounds to aid fast and accurate entry. Additionally or alternatively, voice recognition may be employed with optimized commands to further improve speed/ease of survey inputs. An example of such voice recognition session may include the respondent saying:

(a) "YES," in response to the question "do you want to complete the survey now?" (in response to the respondent's answer, the portable device may sound a short tune');
(b) "VALUE" (in response to this command from the respondent, a dollar sign icon may turn to a bold font and start blinking). If the respondent then says a numeral such as "TWO" (indicating two dollar signs), the portable device may sounds two cash-register "chuchings;" and
(c) "NEXT," (in response to this command from the respondent, a next icon may turn to a bold font and the dollar sign icon un-bolds).

In the examples described herein, a survey may not be limited to traditional text-based questions and answers, but can also take the forum of asking the respondent to perform an action such as, for example, to take a picture at a certain time and/or at a certain object, area, direction, or activity. Any or all of the details of the example systems and methods described above would apply to the activity-based surveys. For example, when one or more triggering conditions or other criteria are met (e.g., client requirements, time passage, location inside a triggering store or department such as a men's department), a respondent may be instructed to take a picture of an identified area and/or activity. The specific instructions and/or possibilities may include, without limitation, to take a photo of shelving and/or racks (to determine levels of stocking, variety, number of shoppers in the area, neatness, cleanliness, dominate colors, styles), to take a photo of other shoppers (to determine what other shoppers are wearing and/carrying such as logos and/or bags from other stores and to determine clues to weather conditions such as rain coats, heavy jackets, no jacket/short sleeves, etc.), to take a photo of check out areas (to determine length of lines, number of customers, total number of cash registers, ratio of open/closed registering), to take a photo of a front of a store (to determine signage, store sales, decoration, site impairments, style, lighting, presence of people) and/or to take general pictures that best describe what activity the respondent(s) are undertaking (e.g., a picture of laundry may indicate that the respondent was doing laundry, a picture of a soccer game may indicate the respondent was taking a kid to a soccer game, a television may indicate watching television, a car lot may indicate looking around a car lot and/or buying a car, an inside of a bus or train may indicate traveling on a bus or train, a desk with papers may indicate working and/or doing homework at a desk, a movie screen may indicate going to the theatre, a crowd at a mall may indicate shopping at a mall, etc.).

Although certain methods, apparatus, articles of manufacture and/or systems have been described herein, the scope of coverage of this patent is not limited thereto. To the contrary, this patent covers all methods, apparatus, articles of manufacture and/or systems fairly falling within the scope of the appended claims either literally or under the doctrine of equivalents.

What is claimed is:

1. An apparatus, comprising:
an activity sensor to generate activity information indicative of an activity of a person;
a location sensor to:
  receive wireless signals indicative of a location of a portable device carried by the person; and
  generate location information based on the wireless signals, the location information corresponding to the location of the portable device carried by the person;
media monitoring information sensors including a microphone and a radio frequency (RF) sensor, the media monitoring information sensors to:
  generate, based on first and second signals, media monitoring information associated with the portable device of the person and at least one of an advertisement or a product, the first signal corresponding to audio from first media associated with the at least one of the advertisement or the product, the second signal corresponding to an RF signal from an RF broadcast device adjacent second media associated with the at least one of the advertisement or the product, the second media distinct from and located apart from the first media, the microphone to detect the first signal, the RF sensor to detect the second signal;
at least one memory storing executable instructions; and
a processor that executes the instructions to:
  communicate, in real-time, with at least one of the location sensor or the media monitoring information sensors to detect exposure of the person to the at least one of the advertisement or the product, the detected exposure associated with the portable device being within a proximity of the at least one of the advertisement or the product for a set duration;
  determine a number of exposures the person has had to the at least one of the advertisement or the product based on the media monitoring information, first and second ones of the exposures corresponding to respective ones of the first and second media;
  automatically retrieve a survey question based on the activity information and based on the number of exposures satisfying a first rule from a criteria database, the first rule to control selection of the survey question;
  identify a recall time when the survey question is to be offered to the person, the recall time corresponding to a duration after satisfaction of the first rule and after the person is no longer exposed to the first media and no longer exposed to the second media;
  determine, at the recall time, a speed of travel of the person based on at least one of the location information or the activity information; and
  compare the speed of travel to a threshold; and
  automatically offer, via a communication interface, at the recall time, the survey question related to the at least one of the advertisement or the product via the portable device when the processor determines the speed of travel is beneath the threshold, or suppress the survey question when the processor determines the speed of travel is above the threshold.

2. The apparatus as defined in claim 1, wherein the threshold is associated with a speed indicative of driving.

3. The apparatus as defined in claim 1, wherein the activity sensor is to generate the activity information while the person is in a vehicle.

4. The apparatus as defined in claim 1, wherein the processor is to:
generate a predicted schedule of the person based on the activity information and the location information; and
identify the recall time to provide the survey question to the person by evaluating the predicted schedule against a second rule in the criteria database.

5. The apparatus as defined in claim 1, wherein the person is a first person and the portable device is a first portable device, the processor to provide a response to the survey question to a second person associated with a second portable device.

6. The apparatus as defined in claim 1, wherein the first rule includes the person being exposed to the at least one of the advertisement or the product a first threshold number of times of at least one.

7. The apparatus as defined in claim 6, wherein the at least one of the advertisement or the product is at least one of a first advertisement or a first product, the first rule including the person being exposed to at least one of a second advertisement or a second product a second threshold number of times of at least one, the second advertisement being different than the first advertisement, and the second product being different than the first product.

8. A hardware storage device comprising machine readable instructions that, when executed by a processor, cause the processor to perform the operations of:
generating, by an activity sensor, activity information indicative of an activity of a person;
generating, by a location sensor, location information based on wireless signals received by a portable device carried by the person, the location information corresponding to a location of the portable device carried by the person;
generating, by media monitoring information sensors including a microphone and a radio frequency (RF) sensor, based on first and second signals, media monitoring information associated with the portable device of the person and least one an advertisement or a product, the first signal corresponding to audio from first media associated with the at least one of the advertisement or the product, the second signal corresponding to an RF signal from an RF broadcast device adjacent second media associated with the at least one of the advertisement or the product, the second media distinct from and located apart from the first media, the microphone to detect the first signal, the RF sensor to detect the second signal;
communicating, in real-time, with at least one of the location sensor or the media monitoring information sensors to detect exposure of the person to the at least one of the advertisement or the product, the detected exposure associated with the portable device being within a proximity of the at least one of the advertisement or the product for a set duration;
determining a number of exposures the person has had to the at least one of the advertisement or the product based on the media monitoring information, first and second ones of the exposures corresponding to respective ones of the first and second media;
automatically retrieving a survey question based on the activity information and based on the number of exposures satisfying a first rule from a criteria database, the first rule to control selection of the survey question;
identifying a recall time when the survey question is to be offered to the person, the recall time corresponding to a duration after satisfaction of the first rule and after the person is no longer exposed to the first media and no longer exposed to the second media;
determining, at the recall time, a speed of travel of the person based on at least one of the location information or the activity information;
comparing the speed of travel to a threshold;
automatically offering, via a communication interface, at the recall time, the survey question related to the at least one of the advertisement or the product via the portable device when the speed of travel is beneath the threshold; and
suppressing, at the recall time, the survey question when the speed of travel is above the threshold.

9. The hardware storage device as defined in claim 8, wherein the threshold is associated with a speed indicative of driving.

10. The hardware storage device as defined in claim 8, wherein the instructions further cause the machine to generate the activity information while the person is in a vehicle.

11. The hardware storage device as defined in claim 8, wherein the instructions further cause the machine to:
generate a predicted schedule of the person based on the activity information and the location information; and
identify the recall time to provide the survey question to the person by evaluating the predicted schedule against a second rule in the criteria database.

12. The hardware storage device as defined in claim 8, wherein the person is a first person and the portable device is a first portable device, and the instructions to cause the machine to provide a response to the survey question to a second person associated with a second portable device.

13. The of hardware storage device as defined in claim 8, wherein the first rule includes the person being exposed to the at least one of the advertisement or the product a first threshold number of times of at least one.

14. The of hardware storage device as defined in claim 13, wherein the at least one of the advertisement or the product is at least one of a first advertisement or a first product, the first rule including the person being exposed to at least one of a second advertisement or a second product a second threshold number of times of at least one, the second advertisement being different than the first advertisement, and the second product being different than the first product.

15. A method comprising:
generating, by an activity sensor, activity information indicative of an activity of a person;
generating, by a location sensor, location information based on wireless signals received by a portable device carried by the person, the location information corresponding to a location of the portable device carried by the person;
generating, by media monitoring information sensors including a microphone and a radio frequency (RF) sensor, based on first and second signals, media monitoring information associated with the portable device of the person and at least one of an advertisement or a product, the first signal corresponding to audio from first media associated with the at least one of the advertisement or the product, the second signal corresponding to an RF signal from an RF broadcast device adjacent second media associated with the at least one of the advertisement or the product, the second media distinct from and located apart from the first media, the microphone to detect the first signal, the RF sensor to detect the second signal; and
communicating, in real-time, with at least one of the location sensor or the media monitoring information sensors to detect exposure of the person to the at least one of the advertisement or the product, the detected exposure associated with the portable device being within a proximity of the at least one of the advertisement or the product for a set duration;
determining a number of exposures the person has had to the at least one of the advertisement or the product based on the media monitoring information, first and second ones of the exposures corresponding to respective ones of the first and second media;

automatically retrieving a survey question based on the activity information and based on the number of exposures satisfying a first rule from a criteria database, the first rule to control selection of the survey question;

identifying a recall time when the survey question is to be offered to the person, the recall time corresponding to a duration after satisfaction of the first rule and after the person is no longer exposed to the first media and no longer exposed to the second media;

determining, at the recall time, a speed of travel of the person based on at least one of the location information or the activity information;

comparing the speed of travel to a threshold;

automatically initiating, at the recall time, communication of the survey question related to the at least one of the advertisement or the product via the portable device when the speed of travel is beneath the threshold; and suppressing, at the recall time, the survey question when the speed of travel is above the threshold.

16. The method as defined in claim 15, wherein the threshold is associated with a speed indicative of driving.

17. The method as defined in claim 15, further including generating the activity information while the person is in a vehicle.

18. The method as defined in claim 15, further including:
generating a predicted schedule of the person based on the activity information and the location information; and
identifying the recall time to provide the survey question to the person by evaluating the predicted schedule against a second rule in the criteria database.

19. The method as defined in claim 15, wherein the first rule includes the person being exposed to the at least one of the advertisement or the product a first threshold number of times of at least one.

20. The method as defined in claim 19, wherein the at least one of the advertisement or the product is at least one of a first advertisement or a first product, the first rule including the person being exposed to at least one of a second advertisement or a second product a second threshold number of times of at least one, the second advertisement being different than the first advertisement, and the second product being different than the first product.

* * * * *